US007185923B2

(12) United States Patent
McNeil et al.

(10) Patent No.: US 7,185,923 B2
(45) Date of Patent: Mar. 6, 2007

(54) CONNECTION DEVICE

(75) Inventors: Alexander McKechran Hardie McNeil, Gladesville (AU); Adrian Roger Poulton, Church Meadow, Church Lane, Lapworth, Solihill, West Midlands, B94 5NU, Solihull (GB) B9 5NU

(73) Assignee: Adrian Roger Poulton (GB)

( * ) Notice: Subject to any disclaimer, the term of this patent is extended or adjusted under 35 U.S.C. 154(b) by 296 days.

(21) Appl. No.: 10/257,888

(22) PCT Filed: Apr. 17, 2001

(86) PCT No.: PCT/GB01/01715

§ 371 (c)(1),
(2), (4) Date: Jan. 21, 2003

(87) PCT Pub. No.: WO01/79738

PCT Pub. Date: Oct. 25, 2001

(65) Prior Publication Data

US 2003/0155767 A1 Aug. 21, 2003

(30) Foreign Application Priority Data

Apr. 19, 2000 (GB) ................................. 0009561.2
Mar. 15, 2001 (GB) ................................. 0106401.3

(51) Int. Cl.
*F16L 21/06* (2006.01)

(52) U.S. Cl. ...................... 285/322; 285/305; 285/319; 285/374; 285/399; 285/86

(58) Field of Classification Search ................ 285/305, 285/307, 308, 319, 322, 374, 399, 86, 340, 285/921
See application file for complete search history.

(56) References Cited

U.S. PATENT DOCUMENTS 4,787,657 A * 11/1988 Henniger .................... 285/323

(Continued)

FOREIGN PATENT DOCUMENTS

DE 1 775 427 9/1971

*Primary Examiner*—James M. Hewitt
(74) *Attorney, Agent, or Firm*—Andrus, Sceales, Starke & Sawali, LLP

(57) ABSTRACT

A connection device for fitting to a member, particularly to a corrugated flexible pipe (146, 246, 446) formed with a series of spaced annular grooves, the device comprising first and second tubular bodies (10, 11) coupled together, in use, with the pipe received in an open end of the first body (10). The first body has a plurality of resilient lugs (14) with respective inwardly directed projections (17) at the ends thereof to be received in one of the said grooves to grip the pipe. The two bodies can be relatively angularly moved between a neutral position of the device, where the pipe is retained by the resilience alone of the lugs, an unlocked position, where the lugs are released from the pipe, and a locked position, where the lugs are forced into locking engagement with the pipe, movement of the lugs being controlled by cam formations (29) extending from the end surface of the second body (11). In other embodiments the bodies can have a rotation lock in said locked position and/or neutral position, and/or a lock to prevent outward movement of the lugs when the bodies are in the locked position.

49 Claims, 15 Drawing Sheets

U.S. PATENT DOCUMENTS

Figure 1:
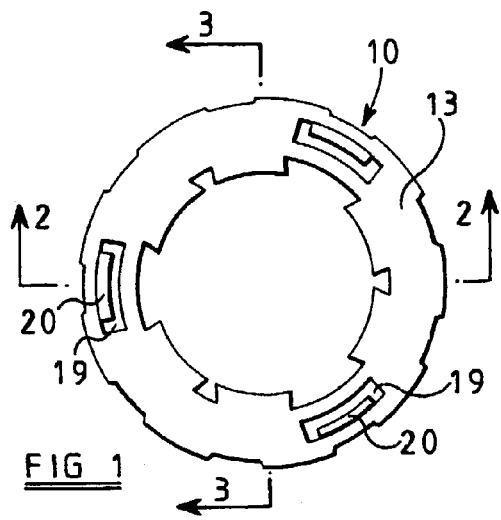

| | | | |
|---|---|---|---|
| 4,836,580 A * | 6/1989 | Farrell | 285/24 |
| 4,989,905 A * | 2/1991 | Rajecki | 285/319 |
| 5,356,181 A * | 10/1994 | Shirogane et al. | 285/86 |
| 5,397,196 A * | 3/1995 | Boiret et al. | 403/348 |
| 5,441,312 A * | 8/1995 | Fujiyoshi et al. | 285/23 |
| 5,799,988 A | 9/1998 | Yeh | |
| 6,036,237 A * | 3/2000 | Sweeney | 285/322 |
| 6,199,920 B1 * | 3/2001 | Neustadtl | 285/322 |
| 6,435,567 B2 * | 8/2002 | Kikumori et al. | 285/319 |
| 6,764,107 B1 * | 7/2004 | Obahi et al. | 285/322 |

* cited by examiner

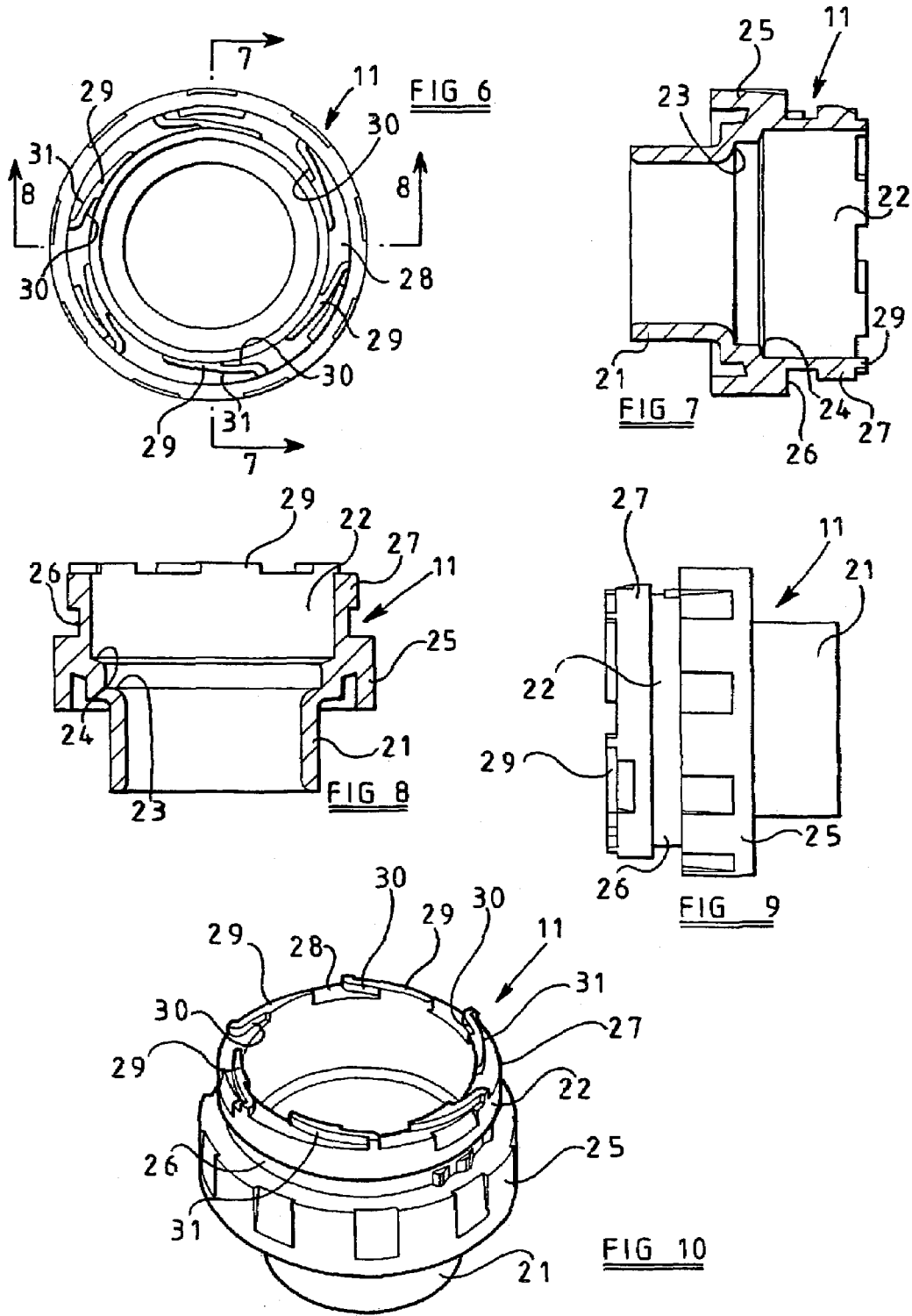

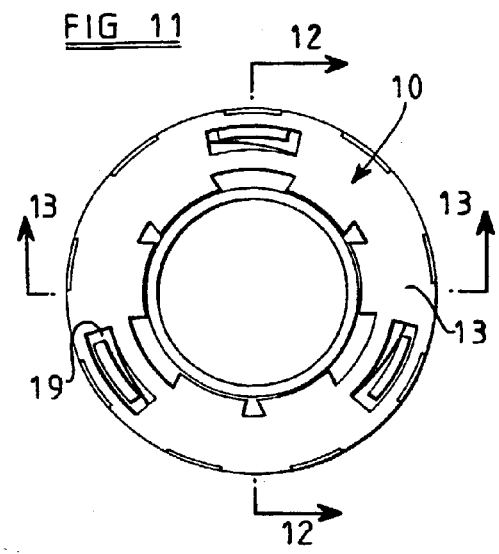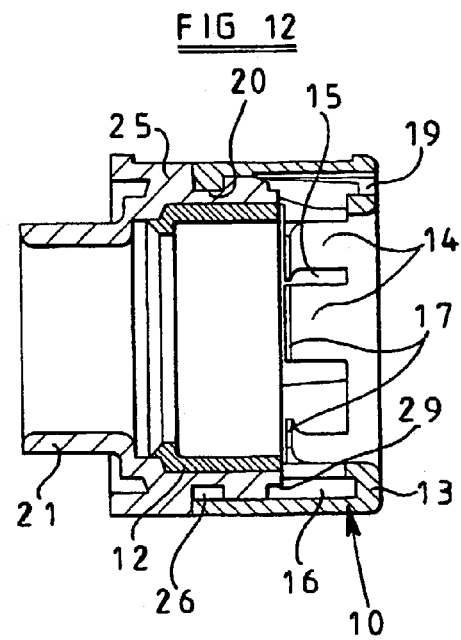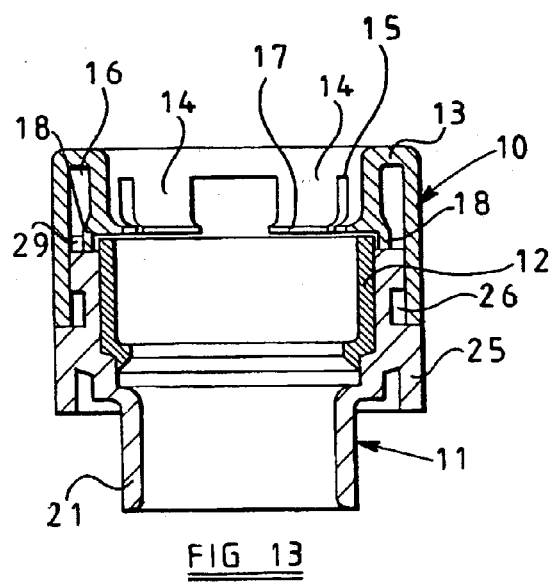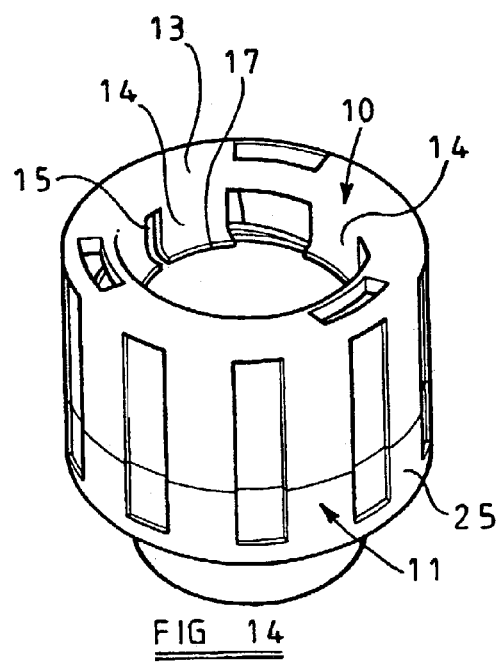

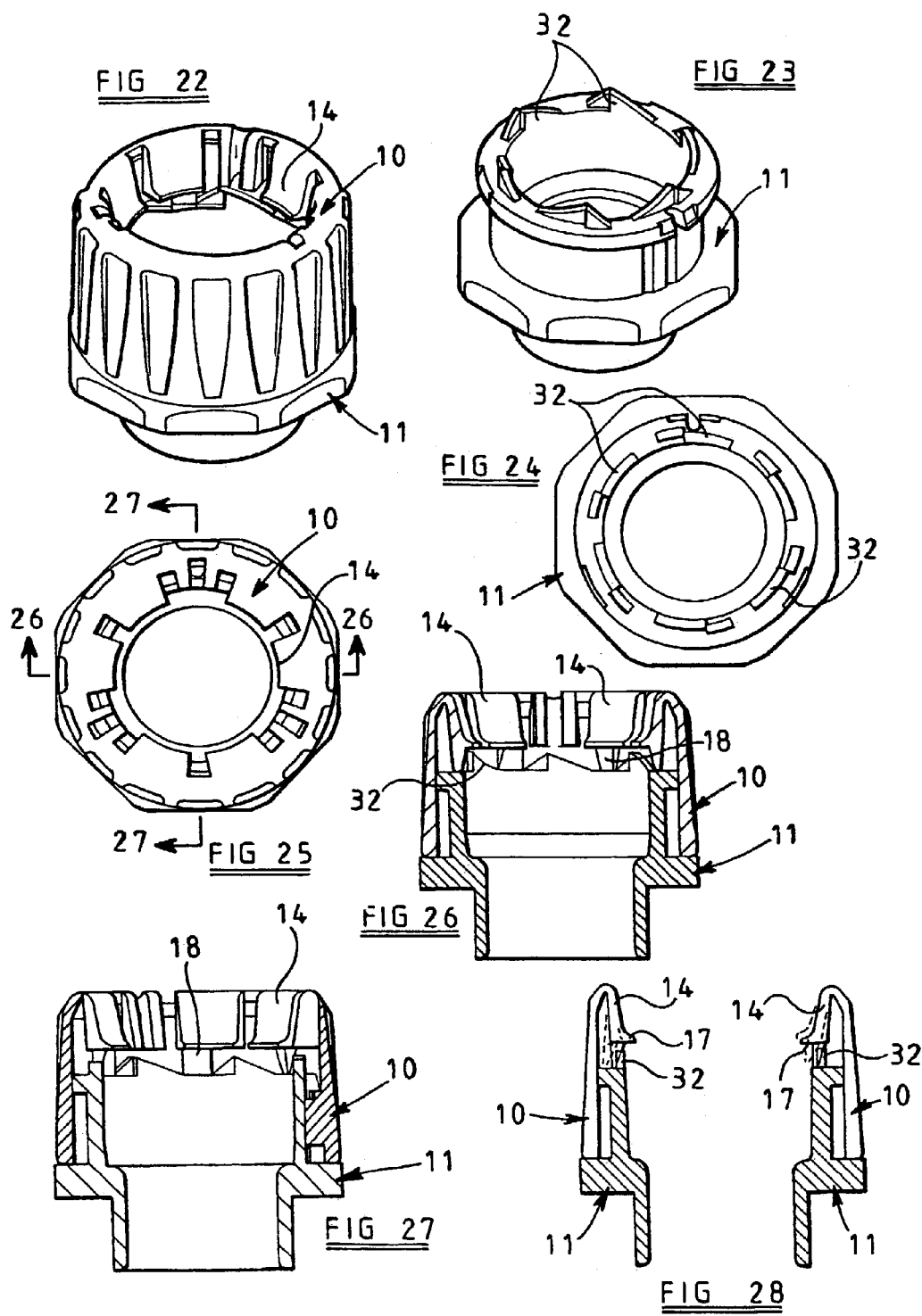

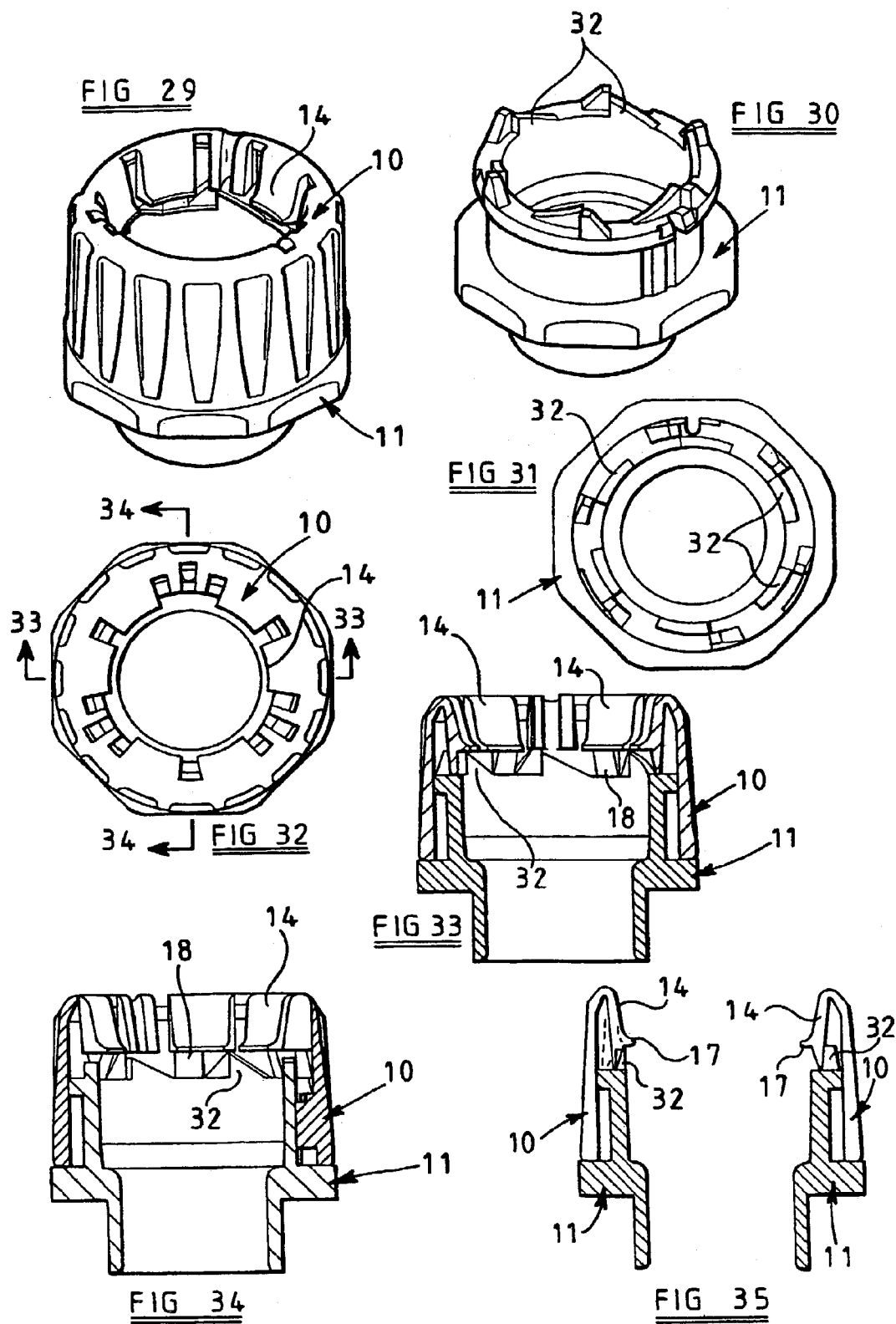

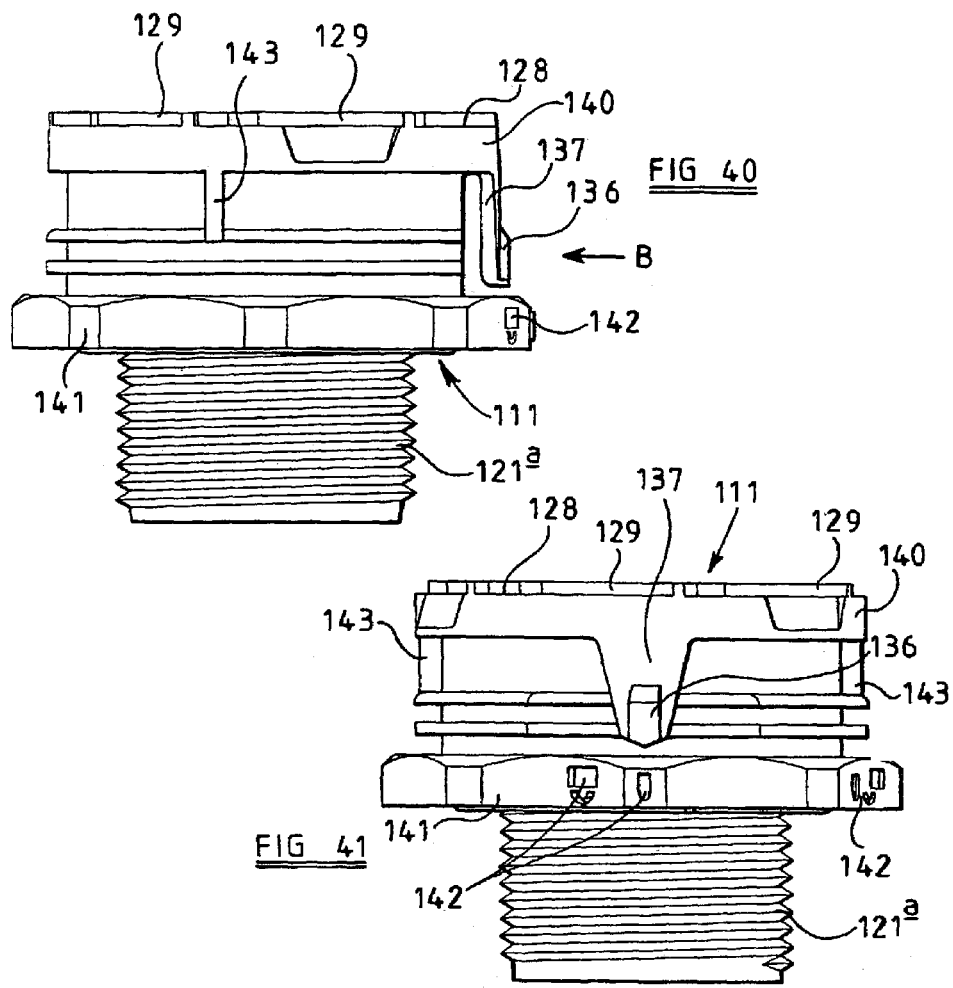
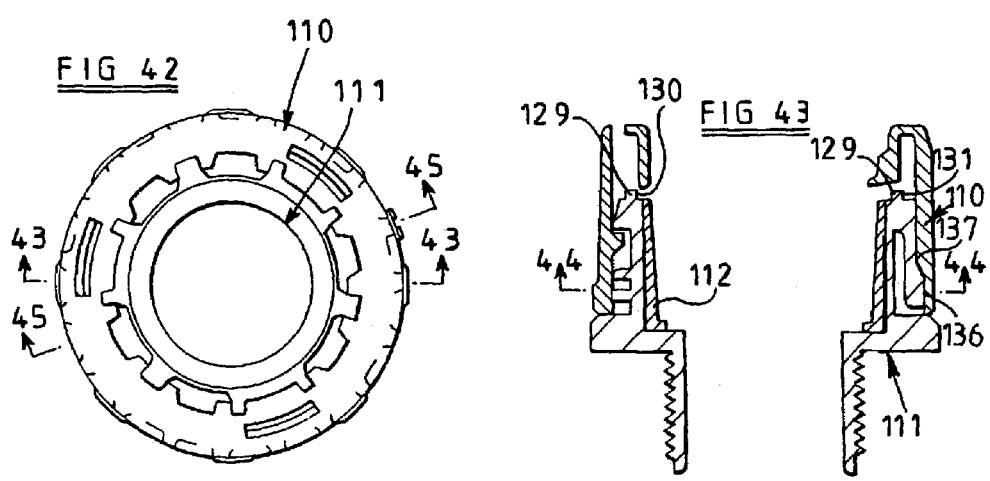

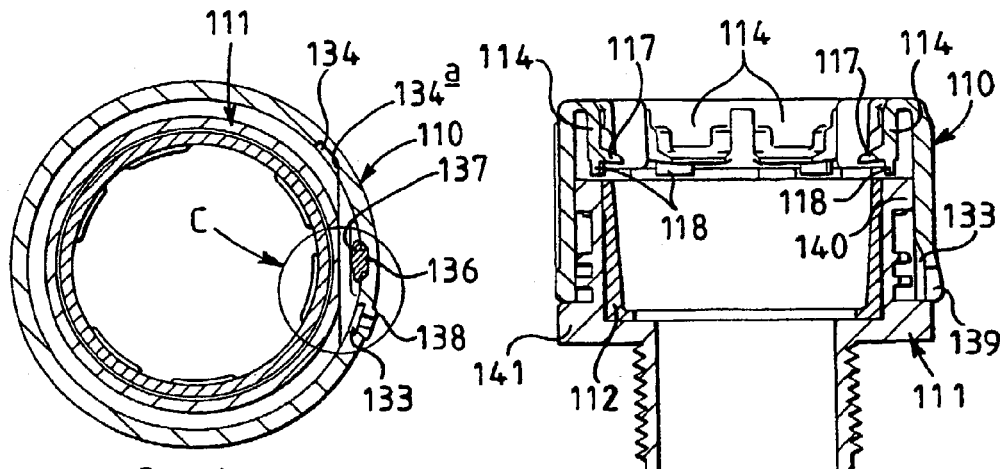
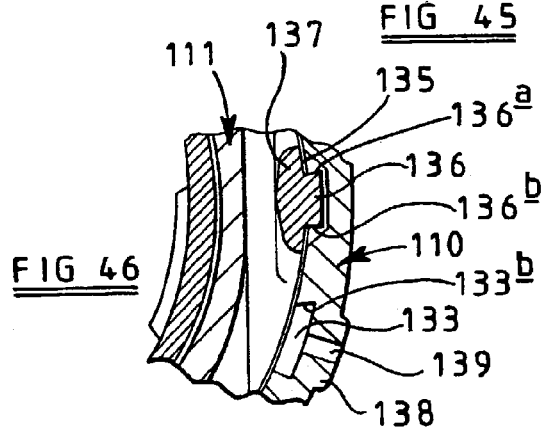
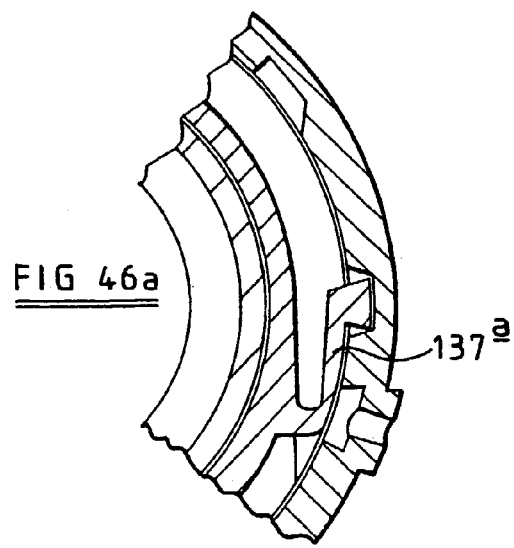

CONNECTION DEVICE

This invention relates to a connection device principally for use with piping or conduit, and has particular application with corrugated flexible pipes of the types commonly used to protect electrical cables and in other similar applications. However a connection device of the invention can also be used with members other than piping or conduit, for example it can be used to retain together respective elements of a plug and socket assembly.

Various connection devices for use with corrugated flexible pipes are known. Generally several of these include a tubular component arranged to receive an end portion of the pipe, the component having a plurality of spring fingers, each with a projection arranged to engage behind a ridge on the inserted corrugated pipe to retain it in the component by virtue of the spring bias. Release of the pipe is, in some instances, possible by manipulation of the fingers by a suitable tool. In other instances the connection includes a release member which is in engagement with said component and which is angularly movable to release the bias of the fingers, thereby allowing removal of the pipe from the tubular component.

With various ones of said known connection devices certain disadvantages have been found. In one case it has been found that if a valley of the corrugated pipe is not properly aligned with the projections of the respective spring fingers, the pipe may be retained in the connection device, but after a period of time, due to creep, the fingers will lose their inwards spring bias from this engagement position. In another case there is axial movement of the release member to displace the fingers outwardly, and it has been found that it can be difficult to move the release member back to the locking state of the device due to having to compress the pipe to do so.

An object of the invention is to provide a connection device in an improved form.

According to a first aspect of the invention, a connection device for fitting to a conduit having a groove adjacent an end thereof comprises a first tubular body having one of its ends open to receive said end of the conduit in a bore communicating with said open end, the first body having a plurality of resilient lugs with respective projections at or adjacent their ends for reception in said groove in said conduit to retain it, in use, and a second tubular body which can be coupled with the first body, there being defined a minimum of two discrete relatively angularly adjusted positions between the first and second bodies when they are coupled together, said two discrete positions being any two from i) a neutral position where the conduit is retained by the resilience alone of said lugs, ii) an unlocked position where the projections are released from the conduit to allow its removal from the first body, and iii) a locked position where the projections are prevented from moving in a direction to release from the conduit.

Preferably the connection device has locking means which, when the first and second bodies are in at least one of said discrete positions, inhibit relative rotation of the first and second bodies therefrom.

More preferably the connection device defines said three discrete positions and the locking means inhibit said relative rotation of the first and second bodies from the locked and/or neutral positions. Desirably the locking means can be released, in use, by application of a tool exteriorly of the connection device.

Conveniently one of the discrete positions includes said locked position, and the second body has a plurality of formations which are arranged such that in said locked position they prevent the projections from moving from a position where the conduit is retained by the resilience alone of said lugs in a direction to release said retention.

More conveniently the connection device defines said three discrete positions and in said locked position said conduit is retained, in use, by the resilience alone of the lugs, and said formations prevent movement of the lugs to release said retention of the conduit. Thus instead of locking the lugs to the conduit, the formations merely prevent outward movement of the lugs.

According to a second aspect of the invention a connection device for fitting to a conduit having a groove adjacent an end thereof comprises a first tubular body having one of its ends open to receive said end of the conduit in a bore communicating with said open end, the first body having a plurality of resilient lugs with respective projections at or adjacent their ends for reception in said groove in said conduit to retain it, in use, and respective engagement means, a second tubular body which can be coupled with the first body, the second body having a plurality of formations arranged such that with said first and second bodies coupled together and in a relative position in which said conduit is retained by the resilience alone of said lugs, the second body is relatively angularly movable from said position to two other positions respectively, in one of which said formations engage said engagement means to apply force which effects a locking of the projections to the conduit, and in the other of which said formations engage said engagement means to apply force which effects a release of the projections from the conduit thereby to allow its removal from said first body.

The connection device of said second aspect can have sealing means to seal with said conduit received in said bore, in use. Preferably the sealing means is a separate component received in said second body. Alternatively, or additionally as an option, the sealing means comprises a tapered section of the interior of the second body whereby said conduit is compressed against and seals against the tapered section in a solid/fluid-tight or substantially tight manner. More preferably the relative angular movement of the second body to said two other positions is in opposite directions respectively. Desirably the engagement means extend axially from respective free ends of the projections. Advantageously the formations extend axially from an inner free end of the second body, and conveniently each formation provides respective inner and outer cam faces.

In one embodiment the lugs are spaced from an inner surface of the fist body, and in another preferred embodiment the first and second bodies are coupled together with at least part of the second body received through the open other end of the first body.

According to a third aspect of the invention a connection device for fitting to a conduit having a groove adjacent an end thereof comprises a first tubular body having one of its ends open to receive said end of the conduit in a bore communicating with said open end, the first body having a plurality of resilient lugs with respective projections at or adjacent their ends for reception in said groove in said conduit to retain it, in use, and respective engagement means, a second tubular body which can be coupled with the first body, the second body having a plurality of formations arranged such that with said first and second bodies coupled together and in a relative position in which said conduit is retained by the resilience alone of said lugs, the second body is relatively angularly movable from said position to another position in which said formations engage said engagement means to apply force which effects a release of the projections from the conduit thereby to allow its removal from said first body, and there being sealing means to seal with said conduit received in said bore, in use.

Preferably the sealing means is a separate component received in said second body. Alternatively, or additionally as an option, the sealing means comprises a tapered section of the interior of the second body whereby said conduit is compressed against and seals against the tapered section in a solid/fluid-tight or substantially tight manner.

Figure 2:
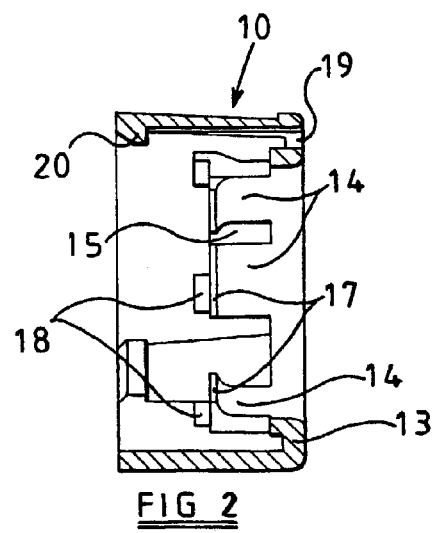
Figure 3:
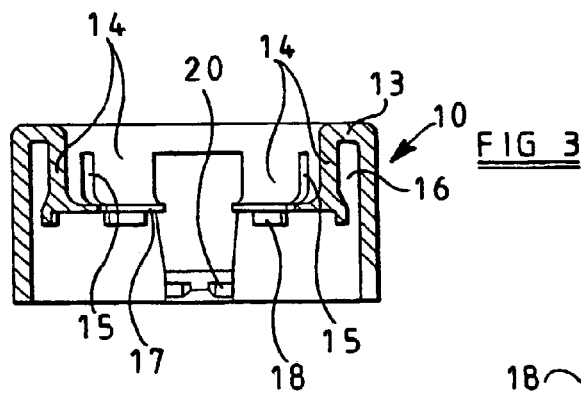
Figure 4:
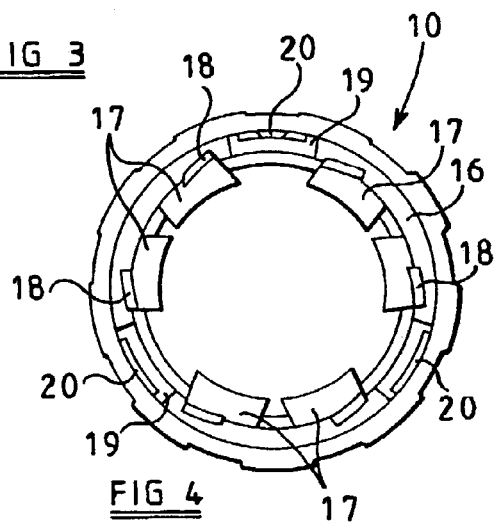
Figure 5:
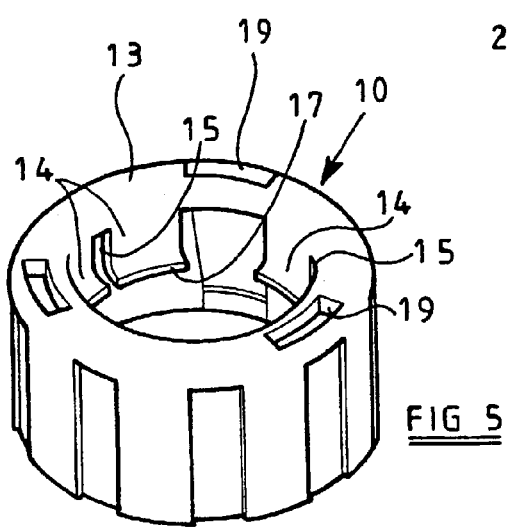
Figure 15:
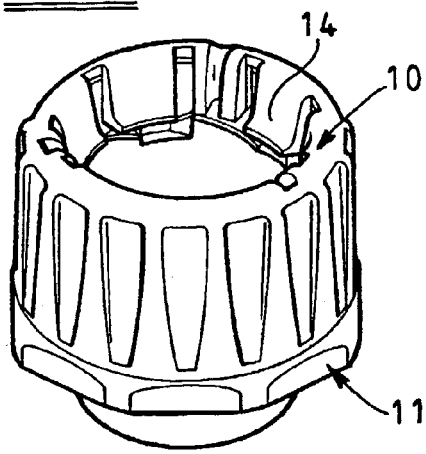
Figure 16:
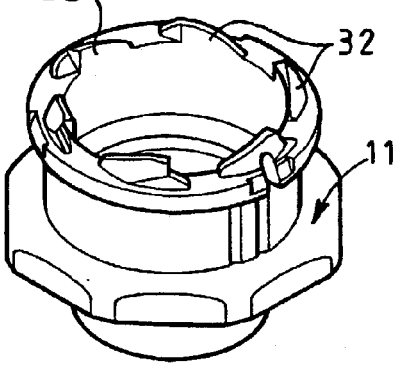
Figure 17:
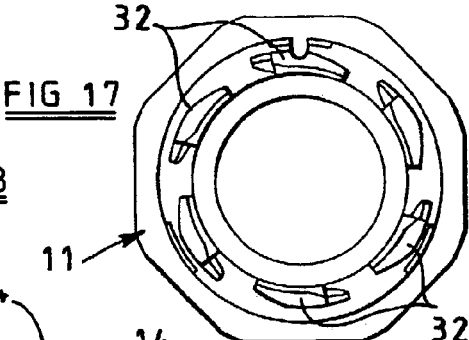
Figure 18:
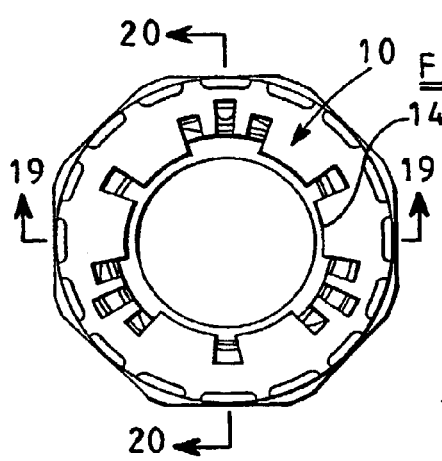
Figure 19:
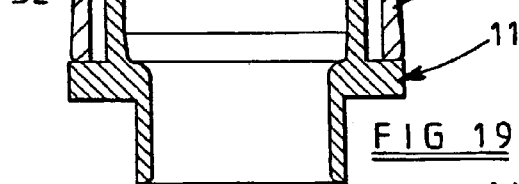
Figure 20:
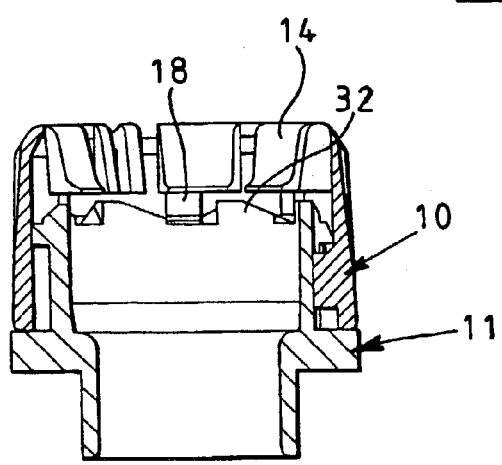
Figure 21:
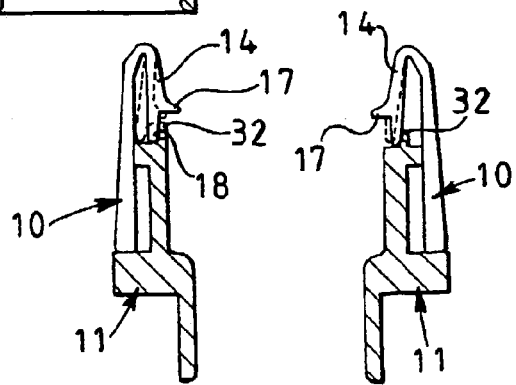
Figure 36:
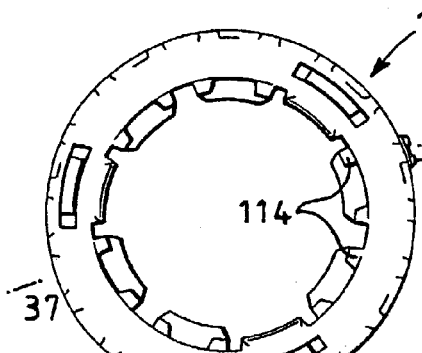
Figure 37:
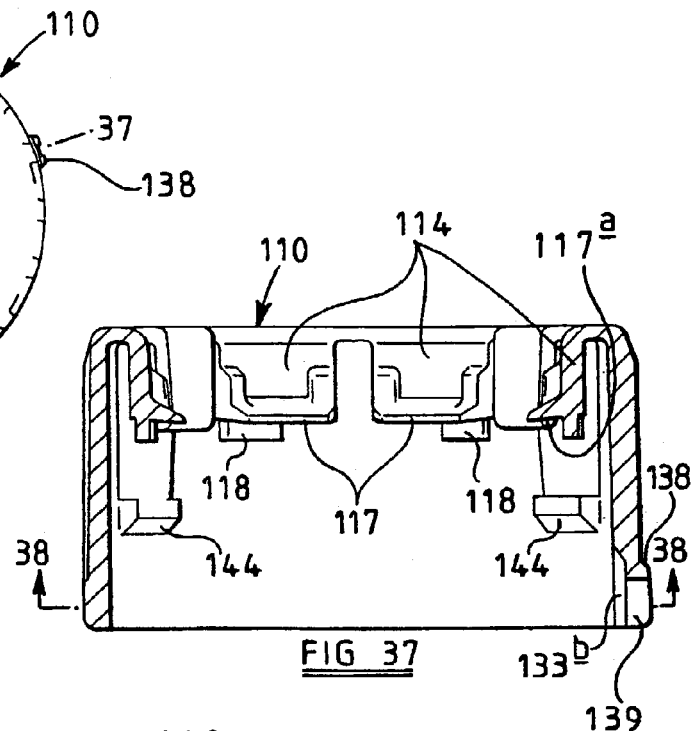
Figure 38:
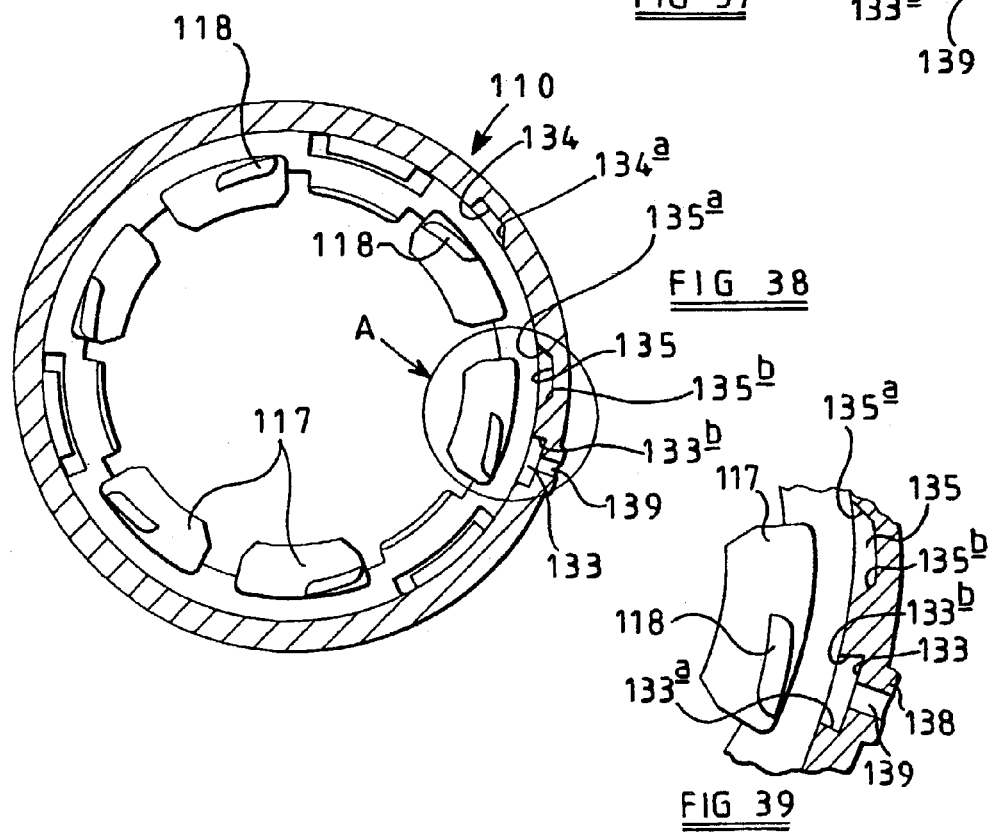
Figure 39:
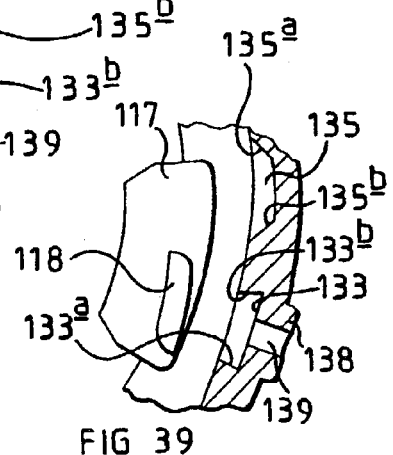
Figure 47:
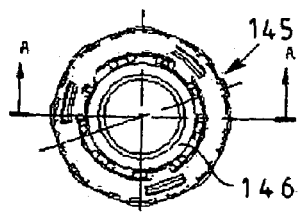
Figure 48:
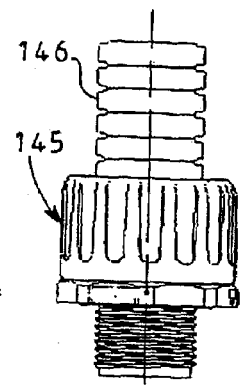
Figure 49:
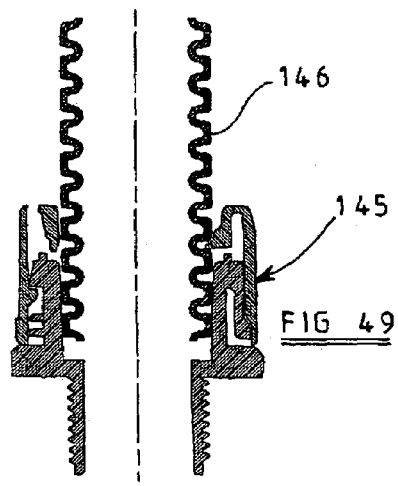
Figure 50:
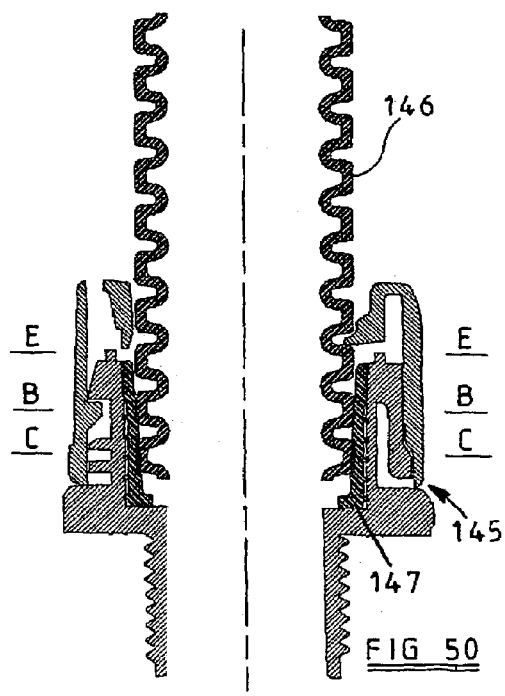
Figure 51:
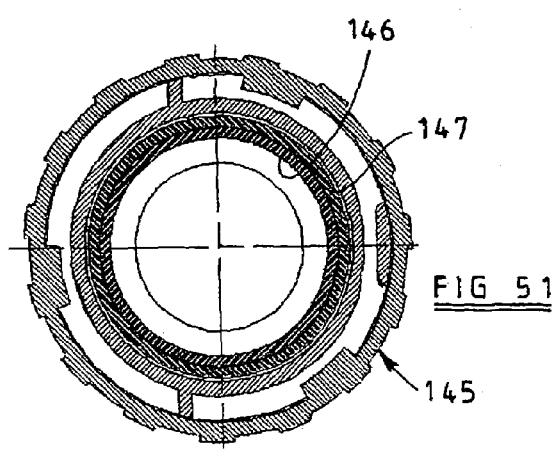
Figure 52:
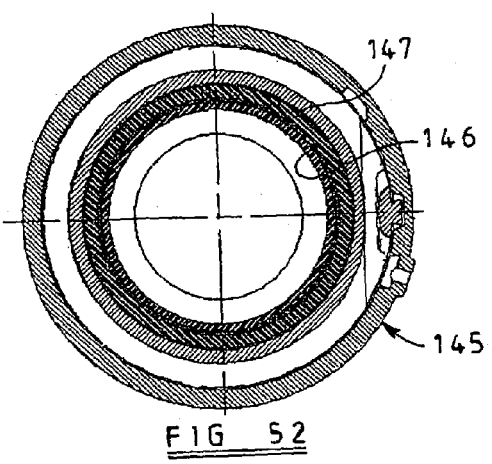
Figure 53:
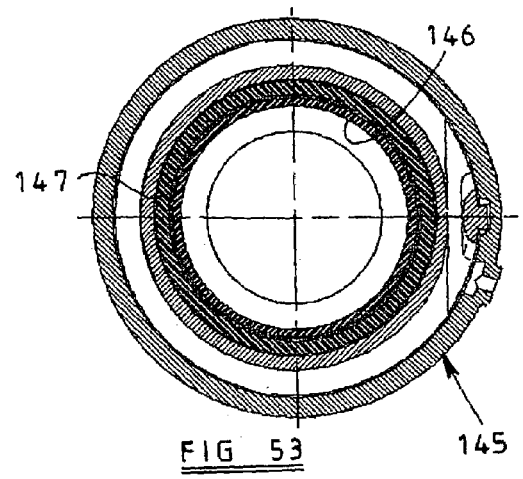
Figure 54:
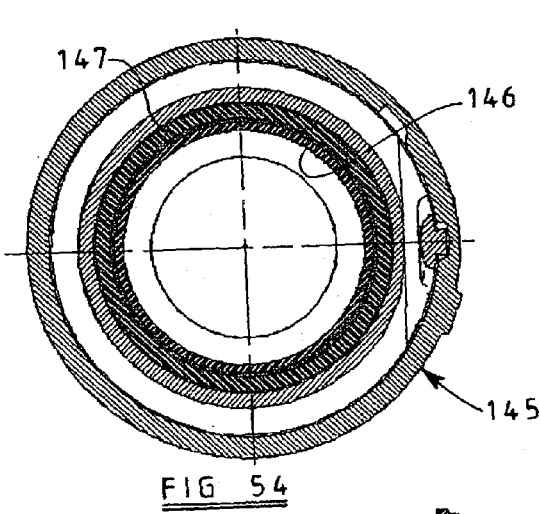
Figure 55:
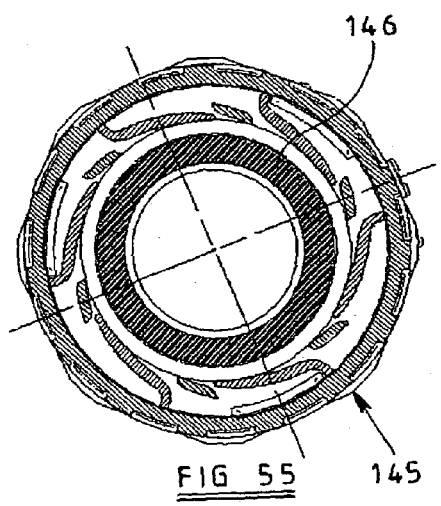
Figure 56:
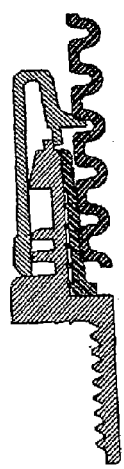
Figure 57:
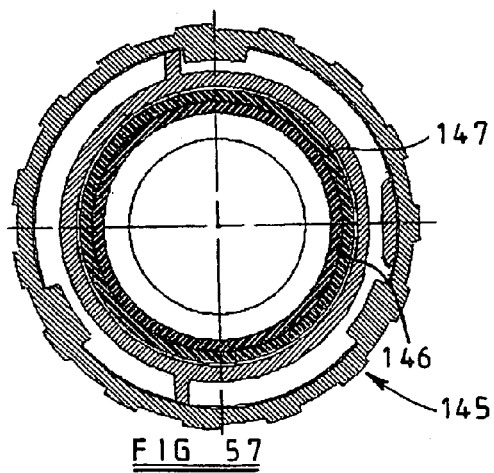
Figure 58:
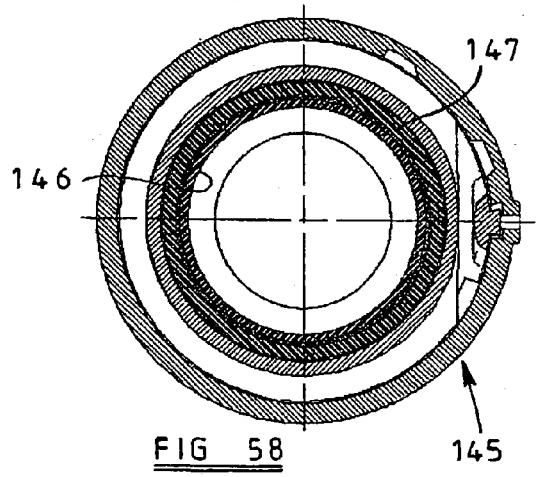
Figure 59:
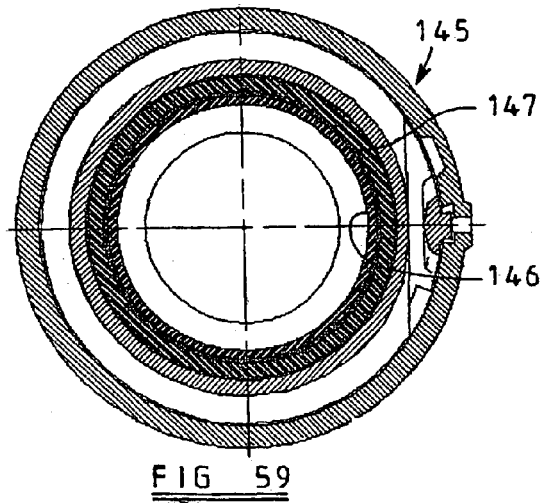
Figure 60:
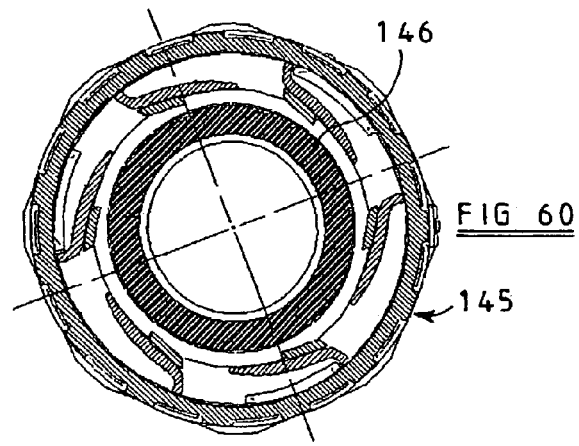
Figure 61:
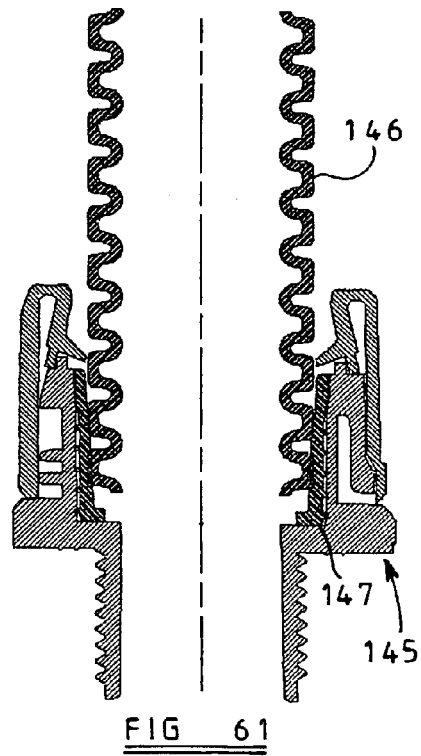
Figure 62:
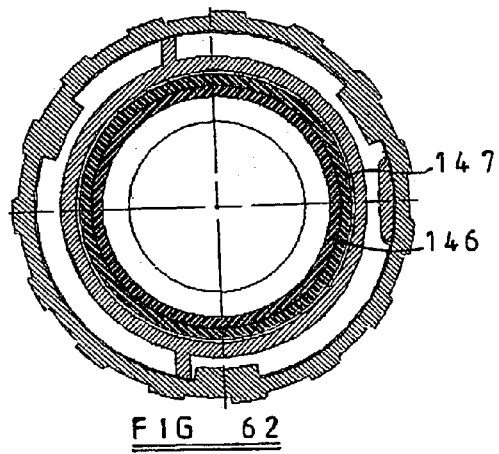
Figure 63:
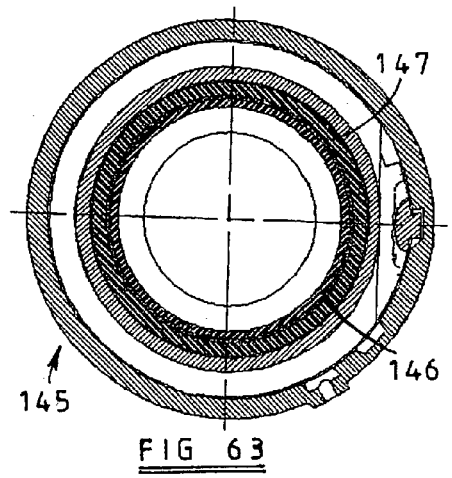
Figure 64:
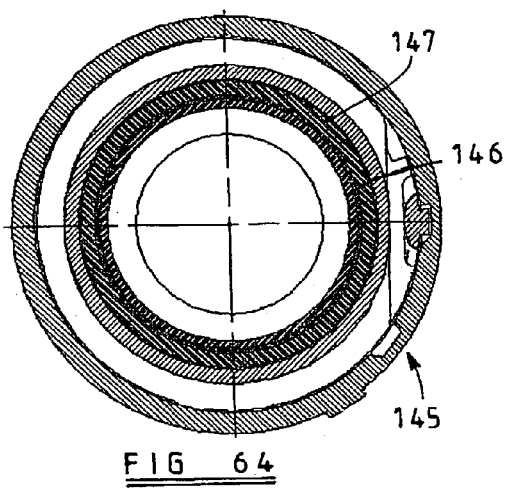
Figure 65:
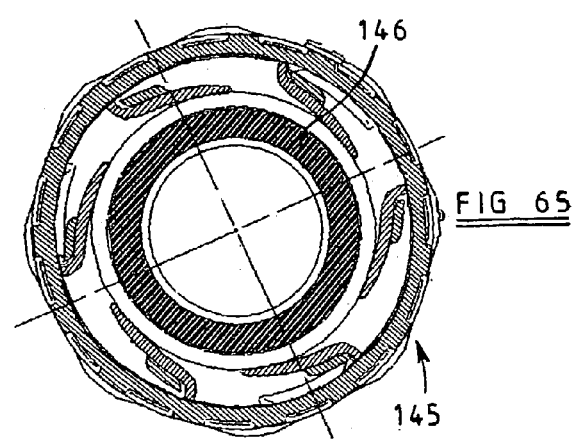
Figure 71:
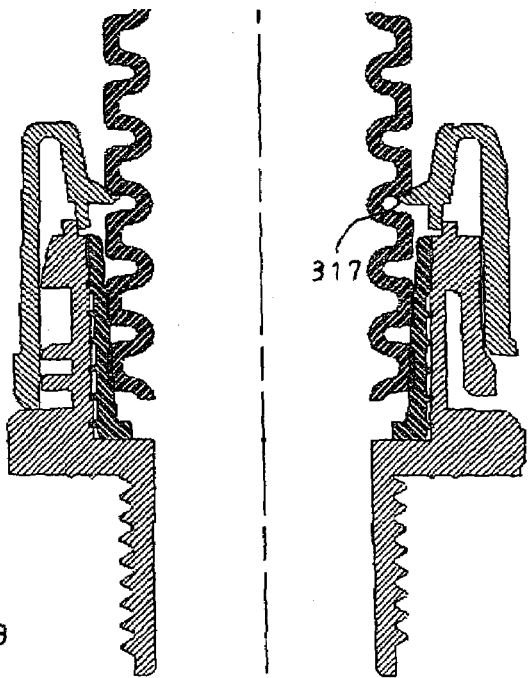
Figure 70:
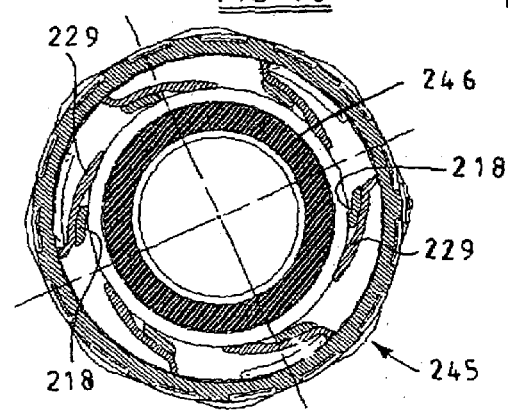
Figure 72:
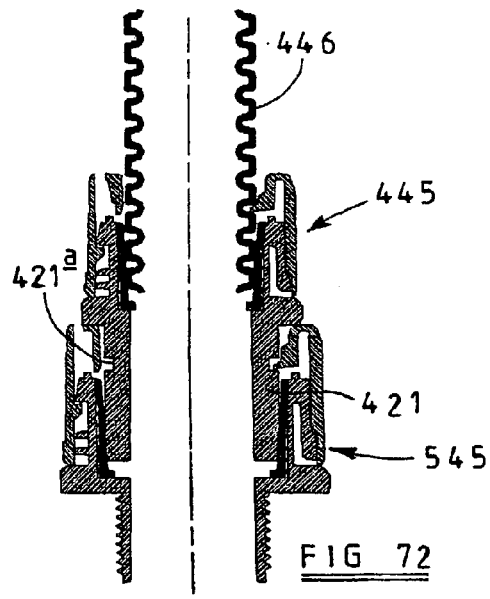
Figure 73:
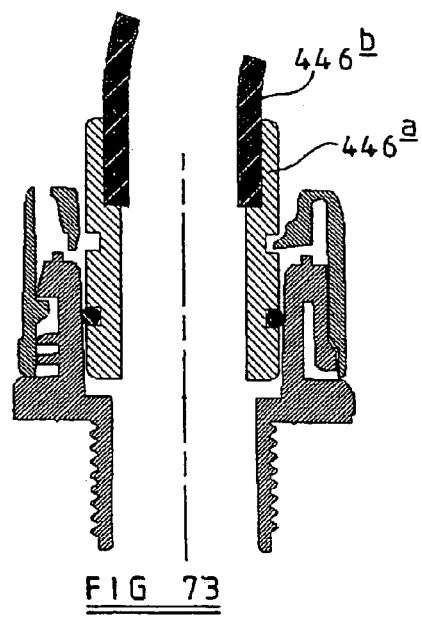
Figure 74:
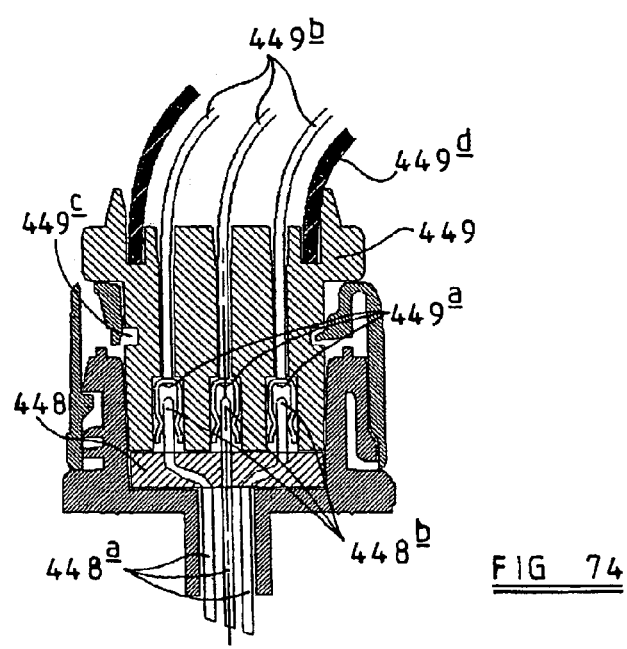

The invention will now be described, by way of example, with reference to the accompanying drawings, in which:

FIG. 1 is a view of one end of a first component of a connection device according to a first embodiment of the invention, FIGS. 2 and 3 are respective sectional views on the lines 2—2 and 3—3 in FIG. 1, FIG. 4 is a view of the other end of the first component, FIG. 5 is a perspective view of the first component, FIG. 6 is a view of one end of a second component of the device, FIGS. 7 and 8 are respective sectional views on the lines 7—7 and 8—8 in FIG. 6, FIG. 9 is a side view of the second component, FIG. 10 is a perspective view of the second component, FIG. 11 is a view of one end of the assembled connection device, FIGS. 12 and 13 are respective sectional views on the lines 12—12 and 13—13 in FIG. 11, FIG. 14 is a perspective view of the assembled connection device, FIG. 15 is a perspective view of an assembled connection device according to a second embodiment of the invention, FIG. 16 is a view corresponding to FIG. 10 for the equivalent component of the device of the second embodiment, FIG. 17 is a top plan view of the component of FIG. 16, FIG. 18 is a top plan view of the assembled device of FIG. 15, FIGS. 19 and 20 are respective sectional views on the lines 19—19 and 20—20 of FIG. 18, FIG. 21 is a schematic section like FIG. 19, with the left and right hand parts showing in dashed the respective results of rotation of the upper component about the lower component in anticlockwise and clockwise directions, FIGS. 22 to 28 are views to a reduced scale corresponding to FIGS. 15 to 21 respectively according to a third embodiment of the invention, and FIGS. 29 to 35 are views to a reduced scale corresponding to FIGS. 15 to 21 respectively according to a fourth embodiment of the invention, FIG. 36 is a view of one end of a first component of a connection device of a fifth embodiment of the invention, FIG. 37 is an enlarged cross-sectional view on the lie 37—37 of FIG. 36, FIG. 38 is a cross-sectional view on the line 38—38 of FIG. 37, FIG. 39 is a detail of the part circled as A in FIG. 38, FIG. 40 is a side view of a second component of the connection device, FIG. 41 is a view on arrow B of FIG. 40, FIG. 42 is a view like FIG. 37 of the two components assembled together, FIG. 43 is a section on line 43—43 of FIG. 42, FIG. 44 is a cross-sectional view on line 44—44 of FIG. 43, FIG. 45 is a cross-sectional view on line 45—45 of FIG. 42, FIG. 46 is a detail of the part circled as C in FIG. 44, FIG. 46a is a detail equivalent to FIG. 46, for a different form of rotation lock finger, FIGS. 47 and 48 are respectively an end view and a side view of an assembled connection device of the invention with a corrugated pipe engaged therewith, FIG. 49 is a section on line A—A of FIG. 47 when the connection device is used without a seal, but with a rotation lock of the embodiment of FIGS. 36 to 46, FIG. 50 is a view corresponding to FIG. 49, but including the use of a seal, and with the device in its neutral position, FIG. 51 is a section on line B—B of FIG. 50, FIG. 52 corresponds to a section on line C—C of FIG. 50, for a connection device with lock, neutral and unlock positions, FIG. 53 corresponds to a section on line C—C of FIG. 50, but for a connection device having neutral and lock positions only, FIG. 54 corresponds to a section on line C—C of FIG. 50, but for a connection device having neutral and unlock positions only, FIG. 55 is a section on line E—E of FIG. 50, FIGS. 56 to 60 correspond to FIGS. 50, 51, 52, 53 and 55 respectively, with the device in its locked position, FIGS. 61 to 65 correspond to FIGS. 50, 51, 52, 54 and 55 respectively, with the device in its unlocked position, FIGS. 66 to 70 correspond to FIGS. 50, 51, 52, 53 and 55 respectively, with the device having a passive lock and being in its 'locked' position, FIG. 71 is a view corresponding to FIG. 56, but showing a different form of lug on the first component, FIG. 72 is a view corresponding to FIG. 50, but showing the device of that Figure engaging a corrugated pipe at one of its ends and having its other end engaged with another connection device of the invention, FIG. 73 is a view corresponding to FIG. 50, but showing a plain conduit connected to the connection device by way of a separate member formed as an end fitting of the plain conduit, and FIG. 74 is a view corresponding to FIG. 50, but showing a plug received in the connection device, the plug being connected to a socket which itself is partly received in the connection device and retained therein, the device being shown in its neutral position.

In the drawings there is shown a connection device constructed according to one embodiment of the present invention, with FIGS. 1 to 5 showing a cap nut 10 and FIGS. 6 to 10 showing a body 11, the cap nut and body each being in one piece and being arranged to be coupled together, in use, to form the assembled fitting shown in FIGS. 11 to 14. By way of example, the fitting will be described fitted to an end of a corrugated pipe or conduit, particularly a plastics material flexible pipe or conduit, and, in the embodiment described, each of the two components of the connection device would be of a plastics material. In the illustrated embodiment sealing means is provided to form a solid (i.e. dust) or fluid-tight seal between the corrugated pipe and the connection device, and, as will be described, in the assembly views of the embodiment of the invention this is shown as an annular internally tapered elastomeric seal 12 which is largely received within the body 11 at a tapered interior annular surface thereof. However the sealing effect could instead be provided by said tapered body surface alone, such that the pipe inserted into the connection device, in use, is compressed against and seals against the tapered section in a solid/fluid-tight manner. In the preferred embodiment, it is intended that the device would be supplied with the seal 12, although this could be removed to seal the pipe at the tapered body surface instead, if required, or alternatively the device could be supplied without the seal 12 and sealing effected at the tapered body surface as mentioned above. Alternatively, however, the connection device could be provided without sealing means.

Referring now specifically to FIGS. 1 to 5, the cap nut 10 is in the general form of a hollow cylinder having one end open, and at its other end a radially directed annular end wall 13 which extends a short distance inwardly where it is formed with a plurality of integral, generally rectangular lugs arranged to extend generally axially away from the end wall 13 into the interior of the nut. As shown in the drawings, there are, in this embodiment, six lugs 14 arranged as three equi-spaced pairs of lugs in the interior of the nut. Whilst there is an axial cut 15 between each pair of lugs, this is substantially less in angular value than the spacing between adjacent pairs of lugs, the cuts and spacings ensuring that each lug is independently flexible, and, due to the plastics material of the one-piece cap nut, is resilient. As shown in the drawings the arrangement of the lugs extending from the inner annular edge of the end wall 13 ensures that, in this embodiment, there is a ring-shaped gap 16 between the inner cylindrical surface of the nut so that, as will be described, in one relatively angularly adjusted position of the coupled nut and body, the lugs can flex outwardly towards said inner surface.

At its inner free end, each lug has a tooth-like projection 17 which is generally normal to the axially directed part of the lug, and is thus orientated towards the centre of the cap nut. At the free end of each lug the main body part of the lug is thickened rearwardly, i.e. adjacent the cylindrical inner wall of the cap nut, to provide a generally rectangular engagement rib 18 at the rear of each projection 17, the rib 18 extending axially from the projection 17 in a direction away from the end wall 13, as best shown in FIG. 3. As best shown in FIG. 4, it can be seen that each rib extends angularly for only approximately half the angular extent of the lug 14 with which it is formed, and moreover each rib is at the side of the lug remote from the other lug with which it forms a pair of lugs. Finally it can be seen that each rib is positioned slightly outwardly from the main body of the lug towards the inner cylindrical wall of the cap nut 10, but is still spaced from said wall so as not to close said gap 16.

As far as the cap nut is concerned, there are two other features which should be noted. Firstly from the drawings it can be seen that the end wall 13 is provided with three equi-spaced generally rectangular apertures 19 therethrough, these apertures being angularly arranged at the angular spacings between the respective pairs of lugs, as for example shown in FIG. 5. Moreover angularly aligned with said three apertures respectively, are ramp-like projections 20 formed integrally on the inner cylindrical wall of the cap nut 10 at the open end thereof. As will be described, these projections form one half of the coupling means between the cap nut 10 and the body 11, the coupling means, in the embodiment described, being a snap-fit by way of the resilient projections 20, as will be described, although other suitable alternative coupling means between the two components of the connection device could be provided, for example some form of screw thread or some form of separate locking member to couple the two components together.

The body 11 is of cylindrical, sleeve-like form, being, like the cap nut 10, preferably of plastics material. Basically the body 11 is formed with two integral portions/sections, the first of these being a cylindrical end section 21 which is shown plain internally and externally, and which leads to a larger diameter, tapered internal housing section 22. The junction between the sections 21 and 22 defines an internal first shoulder 23, and although the interior of the housing section 22 is generally plain, there is defined a second shoulder 24 a short way into the section 22 beyond the shoulder 23. As shown in FIGS. 12 and 13, a shaped end of the annular seal 12, in the assembled state of the connection device, engages against the shoulder 24, whilst, in use, a pipe or similar fitting can be attached to the connection device over the cylindrical end section 21. Although not shown as such in the Figures, the end section 21 would normally be externally or internally threaded to engage with said pipe or similar fitting. Typically a nut is engageable on an external thread on section 21. In another embodiment, the attachment is by way of a bayonet-type fitting.

The external surface of the section 22 is formed with an increased diameter annular grip flange 25 beyond which, in the direction away from the end section 21, is defined an annular groove 26, the free end 27 of the section 22 being of a wall thickness which is increased relative to the groove 26 but is less than the wall thickness at the flange 25. This increased wall thickness at the end of the section 22 defines an axially directed flat annular end surface 28.

The relative dimensions of the nut 10 and body 11 are such that the respective external diameters of the cap nut 11 and flange 25 are similar, as shown in FIGS. 12 to 14. As can also be seen from these Figures, when the two components are coupled together as previously mentioned, the resilient ramp-like projections 20 are snap-fittedly received in the annular groove 26 with the outer annular surface of the section 22 at the end of the body engaging the internal cylindrical wall surface of the cap nut 10. Moreover it can be seen that the axially directed outer annular edge surface at the free end of the cap nut engages the axially directed annular surface formed at the junction of the flange 25 and groove 26 of the body 11, the two components thus being coupled tightly together, as shown in FIGS. 12 and 13, when the projections 20 engage in the groove 26.

As can be seen from FIGS. 6 to 10, the end surface 28 of the body 11 has a number of formations 29, in this embodiment six formations, which are equi-angularly spaced around the end surface 28 and of scroll cam form. Each formation extends a short way axially from the end surface 28, the distance of this extent being approximately equal to the amount that each engagement rib 18 extends beyond its associated projection 17, for example as shown in FIG. 13. Each formation is in the form of a narrow, elongated finger which extends obliquely across the width of the end surface 28 from the outer to the inner side thereof. In this way each formation defines an inner operating surface 30 extending from its one end which is at the outer side of the surface 28, and an outer operating surface 31 extending generally from the end of the formation which is at the inner side of the surface 28. Each of these surfaces, like the formation itself, lies generally obliquely across the end surface 28. As shown in FIG. 6, each outer surface is somewhat longer than the inner surface.

The shape of the formations 29, and their orientation on the end surface 28, is related to the disposition of the ribs 18 on the lugs 14 given that, as will be described, in certain relative angular positions between the cap nut 10 and body 11 the surfaces 30 and 31 will engage the ribs 18 to flex the corresponding lugs 14 either inwardly or outwardly relative to a corrugated pipe inserted into the free end of the cap nut 10. Upon initial pipe insertion, the resilient lugs deform to allow passage of the pipe until its end is fully received against the end of the seal 12 upon full insertion, whereupon the lugs snap back so that the projections 17 thereof are received within an annular groove of the corrugated pipe. In use, the seal can be removed, as previously described, with the pipe, having its end axially compressed, sealing against the internal tapered body surface.

In this state, the end of the pipe is relatively firmly held in the cap nut 10 by the engagement of the projections 17 of the sprung lugs 14 into said one groove of the corrugated exterior surface of the pipe. This engagement is such that under normal circumstances it is alone sufficient to retain the pipe to the cap nut against any normal withdrawal forces. However with an improved connection device of this embodiment, the body 11 is coupled to the cap nut 10, as described by the snap-fit arrangement, so that relative rotation between the body and the cap nut can be used not only to release the pipe from the cap nut 10, if desired, but also to provide a firm mechanical lock additional to the engagement on the pipe provided by the sprung lugs, by actually forcing said lugs inwardly by means of the formations 29.

The inter-relationship between the body 11 and cap nut 10 is such that in this embodiment three discrete positions of relative rotation therebetween are defined. Firstly, in the position described when the pipe is held in the cap nut 10 purely by the force of the sprung, resilient projections 17, the relative rotational position of the body on the cap nut is such that each rib 18 effectively lies in the spacing between a pair of adjacent formations 29. Accordingly, in this position, there is no force acting on each rib and its associated lug is sprung inwardly into engagement with the pipe, as described above. If there is now relative rotation between the cap nut 10 and the body 11 from this 'rest' position, then each rib 18 will be brought into engagement with either a surface 30 at one side or a surface 31 disposed at its opposite side, depending upon the direction of relative rotation. From this it will be appreciated that a rib 18 will be forced outwardly by its inner surface engaging and moving along the outer surface 31 of the formation disposed at its one end, the same rib, with the opposite direction of relative rotation between the components, being forced inwardly by its outer surface engaging and moving along the inner surface 30 of the formation at its other end, it previously having been described how in the 'rest' position the rib lies between two such adjacent formations so that its one end is adjacent one formation and its opposite end adjacent said other formation.

Accordingly it will be appreciated that in the one direction of relative rotation between the cap nut 10 and the body 11, all the ribs are moved inwardly along the inner operating surfaces 30 of the formations thereby mechanically locking the pipe to the cap nut 10 by means of the inward force exerted on said lugs. This additional mechanical force will ensure that the pipe cannot become detached even if the teeth, in time, lose their spring force due to creep. On the other hand, if the direction of relative rotation between the cap nut 10 and the body 11 is in the opposite direction from said 'rest' position, all the ribs 18 move along the outer operating surface 31 of the formations, so that the associated lugs have applied to them an outwardly directed force thereby moving the projections 17 out of the annular groove in the exterior surface of the corrugated pipe, thereby releasing the pipe from the cap nut 10 and enabling it to be removed therefrom when release of the pipe is required.

It will be appreciated that suitable visual means can be provided on the respective exterior surfaces of the cap nut 10 and the body 11 so as to indicate the correct relative rotational positions so that the connection device can be used in its 'rest' or 'neutral' position under normal circumstances, the indication means showing the respective opposite rotational directions which will bring the connection device either to its locked state, or alternatively to its unlocked or release state. For example in one arrangement it could be that the position shown in FIG. 14 is the 'rest' position in that the rectangular recesses in the respective adjacent outer surfaces of the two components match-up. Arrows would additionally be provided to show the rotational direction required from this 'rest' position to lock or release the connection device.

As well as the improvement provided by the additional locking force, already described, the arrangement is also advantageous in that release of the pipe does not involve any axial movement, thereby overcoming the disadvantage mentioned in the introduction where compression of the pipe is necessary to effect release.

In another embodiment, the connection device does not include the feature of possible relative rotation between the cap nut and the body to lock the lugs onto the pipe, although such a device would have sealing means, which could be a seal 12 or the tapered body surface as with the illustrated device.

In all embodiments of the connection device described herein, the first and second bodies identified by the numerals 10 and 11 could be coupled in a different manner without part of the second body being received through an open end of the first body. Moreover the lugs could be arranged other than spaced from an inner surface of the first body.

In each of three alternative embodiments shown in FIGS. 15 to 21, FIGS. 22 to 28 and FIGS. 29 to 35 respectively, the formations 29 previously of scroll cam form are instead at least partly of saw-tooth form, being denoted by the numeral 32. Each device however operates in the same way as for the first embodiment in relation to radial movement of the lugs 14, and for parts in common with the first embodiment the same numerals have been used. Whilst in the first embodiment shown in FIGS. 1 to 14 the engagement means effects movement of the engagement rib by virtue of its change in radius from the centre of rotation of the cap nut, the arrangement is different in the two alternative embodiments shown in FIGS. 22 to 28 and FIGS. 29 to 35 respectively, in that with these embodiments the engagement means effects movement of the engagement rib by virtue of its change in height relative to the inclined surface of the engagement rib. With the embodiment shown in FIGS. 15 to 21, there is a combination of the two different effects mentioned for these other embodiments.

FIG. 21 shows how, for the first of said three alternative embodiments, rotation of the nut 10 through 35° in an anticlockwise direction (Left Hand view) will cause the lugs to flex outwardly, thereby to release the engagement on the pipe, whilst rotation through 10° in a clockwise direction (Right Hand view) will cause the lugs to flex inwardly mechanically to lock the pipe to the cap nut 10. FIGS. 28 and 35 respectively show similar operation for the second and third alternative embodiments, with, in each case, corresponding angles of 30° and 15° for release and locking respectively. For each of these three alternative embodiments, the various sealing options are as described for the embodiment of FIGS. 1 to 14.

In another arrangement, the connection device can have only neutral and unlock discrete positions, together with sealing means for the inserted conduit.

The further alternative embodiment of connection device shown in FIGS. 36 to 46 is similar to the embodiments disclosed in FIGS. 1 to 14, FIGS. 15 to 21, FIGS. 22 to 28, and FIGS. 29 to 35 respectively. The inventive aspect to be described with this further alternative embodiment is applicable to all of said four embodiments. For convenience features of this further alternative embodiment in common with the embodiment of FIGS. 1 to 14 described herein will be given the same numerals, but with prefix '100', and will not be described in detail.

Accordingly with the embodiment shown in FIGS. 36 to 46 there is a cap nut 110 and a body 111, the cap nut and body each being in one piece, of plastics material, and being arranged to be coupled together, in use, to form an assembled pipe connection as shown in FIGS. 42 to 46. This assembly includes an elastomeric seal 112 received in the body 111, nut as with the previously described embodiments, the sealing effect could instead be provided by a tapered body surface alone, such that the pipe inserted into the connection device, in use, can be compressed against and seal against the tapered section. Accordingly, as before, the seal can be formed by the taper, or separately, or alternatively no sealing means may be provided.

As shown in FIGS. 36 to 39, the cap nut is formed with a number, in this embodiment three pairs, of sprung lugs 114 in its interior, with each lug having a tooth-like projection 117 at its inner free end. At the rear of each projection 117 is an engagement rib 118.

The body 111 is of cylindrical, sleeve-like form having one end as a hollow externally threaded spigot 121a. At its end surface 128 remote from the spigot 121a the body has six formations 129 of scroll cam form, each formation defining an inner operating surface 130 and an outer operating surface 131, the number and shape of these formations, and their orientation on the end surface 128, being related to the disposition of the ribs 118 on the lugs 114 of the cap nut. Accordingly as with the previously described embodiments, when the body and the cap nut are engaged together, in certain relative angular positions between them, the surfaces 130 and 131 will engage the ribs 118 to flex the corresponding lugs 114 either inwardly or outwardly relative to a corrugated pipe inserted into the free end of the cap nut. Upon initial pipe insertion, the resilient lugs deform to allow passage of the pipe. The lugs then snap back and the projections 117 thereof are received within an annular groove of a corrugated pipe. In this state the end of the pipe is relatively firmly held in the cap nut by the engagement of the projection 117 of the sprung lugs 114 into said pipe groove.

However as with the previously described embodiments, the inter-relationship between the body 111 and cap nut 110 is such that there are three discrete positions of relative rotation therebetween. The position just described is a 'neutral' position where the sprung lug 114 is at rest and engaged with the pipe. In this 'neutral' position, with the connection device 'at rest', i.e. with there being no force acting on the pipe trying to withdraw it from the connection device, the conduit is retained, as stated, by the resilience alone of the lugs. However preferably both with this embodiment and the previously described embodiments, the geometry of each sprung lug positions the tip of the projection 117 offset from the root of the spring lug, so that when a load is applied to the tip of the projection (in a direction substantially parallel to the axis of the conduit, during attempted withdrawal of the conduit), the eccentric loading of the spring lug will tend to produce a force oriented substantially normal to and in a direction towards the axis of the conduit. The front face 117a of the projection 117 will preferably not be normal to the axis of the conduit, but slightly raked backwardly, to ensure that it is the projection tip which contacts the conduit corrugation, so that if, during attempted withdrawal of the conduit, the spring lug flexes towards the conduit, the projection tip will continue to be the area of the front face of the sprung lug which is in contact with the conduit.

Relative rotation in one direction between the cap nut 110 and the body 111 from this neutral position causes a rib to be forced outwardly, thereby releasing the pipe, whilst relative rotation in the opposite direction from the neutral position forces the rib inwardly so as to lock the pipe in position in the connection device.

Whilst the embodiment of the connection device shown in FIGS. 1 to 14, FIGS. 15 to 21, FIGS. 22 to 28 and FIGS. 29 to 35 are advantageous over previously known devices in that the problem referred therein due to creep is overcome by ensuring that the locking referred to can only take place if the projection are correctly engaged in the pipe groove, some applications require that such connection device be tamper resistant and should not release as a result of vibration. Additionally some applications require that removal of the pipe from the connection device should require the use of an implement/tool.

The embodiment shown in FIGS. 36 to 46 meets these requirements. In particular the connection device is provided with locking means which, when the body and cap nut have been relatively rotated to the position in which the pipe is locked, operate to resist relative rotation between said components from said locked position. A double lock is thus provided. Accordingly the connection device is tamper resistant and additionally the locking of the pipe resists inadvertent release through vibration. Additionally a tool/implement is required to effect release of said locking means to allow relative rotation between the components to the neutral or unlocked state.

With regard to the cap nut 110 shown in FIGS. 36 to 39, it can be seen tat spaced around the inner surface of the cap nut adjacent its free end remote from that at which the lugs 114 are formed, are three grooves 133, 134 and 135 respectively angularly spaced from one another, the angular spacing of the groove 134 from the middle groove 135 being greater than the spacing of groove 133 from groove 135. As will be described, a projection 136 on an outwardly biased, flexible locking finger 137 of the body 111 engages in the groove 133, the groove 134 or the groove 135 in the three discrete relative rotation positions of the cap nut 110 and body 111 previously described. In particular the projection 136 engages in the groove 134 in the pipe unlock or release position and in the groove 135 in the 'neutral' position where the pipe is held in the connection device but not locked thereto. Finally the projection 136 engages in the groove 133 in the position of relative rotation between the cap nut 110 and body 111 where the pipe is locked in the connection device by the inwards movement of the projections 117 of the lugs 114 into the groove of the pipe. The respective opposite sides of the projection are undercut and radial as shown at 136a and 136b respectively in FIG. 46.

As can be seen from FIGS. 38 and 39, the respective opposite sides of the grooves 133 to 135 are shaped in a particular manner so as to regulate the movement of the projection 136 into and out of said grooves. Firstly it can be seen that with the groove 134 its one side nearest the groove 135 has a sloping surface 134a which assists movement of the projection 136 on the sprung finger 137 out of the groove 134 when the projection is moving in a clockwise direction as viewed in FIGS. 38 and 44. The opposite side of the groove is generally radial. Accordingly the projection 136 can be moved into said groove 134 in an anticlockwise direction, and moved in a clockwise direction out of said groove. With the groove 135, it can be seen that both of its side surfaces 135a and 135b respectively are sloping in a similar manner as surface 134a, and it will thus be appreciated that the projection 136 can move out of the groove 135 whether it is being moved clockwise or anticlockwise as viewed in FIGS. 38 and 44. The ease of movement of the projection 136 out of the groove 134, and into and out of the groove 135, will depend on the respective slopes of the surfaces 134a, and 135a and 135b. In particular the respective slopes of surfaces 135a and 135b can be different, so that it is easier to move the projection out of groove 135 in a clockwise direction than in an anticlockwise one.

The part of the wall of the cap nut 110 at which the groove 133 is formed, is thickened outwardly. This thickened portion 138 has a straight opening 139 therethrough so that the portion is of inverted U-shape when the cap nut is viewed in its FIG. 37 orientation, the opening extending through both this thickened portion 138 and also the portion of the normal wall thickness of the cap nut 110 outwardly of the groove 133. As can be thus seen from FIGS. 37 to 39, the provision of the opening allows access from the outside of the cap nut to the groove 133.

The groove 133 has its one side surface 133a remote from the groove 135 formed radially in the same manner as the radial side surface of the groove 134. However the groove 133 has is other side surface 133b formed as a slight undercut, as shown in detail in FIG. 39, the surface 133b matching surface 136a of projection 136. Accordingly it will be appreciated that whilst clockwise rotation of the projection 136 will effect engagement of the projection in the groove 133, by virtue of the locking finger flexing outwardly when it reaches the groove 133, the projection 136, which is a close fit in the groove 133, will not easily thereafter be released from the groove 133 merely by attempted relative anticlockwise movement between the projection and the cap nut, since the side 136a of the projection will engage against the matching undercut side surface 133b which prevents movement of the projection, contrary to the sloping surfaces of the grooves 134 and 135 which aid movement of the projection out of each groove. In fact such relative anticlockwise movement will cause the surfaces 136a and 133b to move more tightly into (locking) engagement.

The body 111 shown in FIGS. 40 and 41 is substantially of the same form as the body of the embodiments of the connection device of FIGS. 1 to 14, 15 to 21, 22 to 28, and 29 to 35, but differs therefrom in the provision of the locking finger 137 and the projection 136 thereon. The finger and projection are shown in FIGS. 40 and 41 where it can be seen that the finger projects integrally from the underside of a cylindrical flange 140 around the open end surface of the body at which the formations 129 are provided. It can be seen that this finger extends in a direction substantially parallel to the central axis of the body, being spaced outwardly from the portion of the body between the formations 129 and an hexagonal grip flange 141 from which the threaded end spigot 121a extends. At least the finger 137, and in this illustrated embodiment the whole of the body 111, is made of plastics material so that the finger is, as stated, flexible. As can be seen from FIG. 41, the finger tapers (narrows) in a direction towards the flange 141, with the projection being formed integrally adjacent the narrowest free end part of the finger. The projection can be of any suitable form to cooperate with the grooves 133 to 135 respectively, and as shown in this embodiment it is generally rectangular in plan having straight longer sides but with a sloping upper surface merging into the outer surface of the finger 137. The finger can also be of any suitable form and shape. For example it could taper in a direction away from the flange 141 and be arranged to flex adjacent flange 140, or it could be arranged as a rib 137a oriented substantially tangentially to the external cylindrical surface of the body. This alternative finger form is shown in FIG. 46a, where the rib 137a is shown in the neutral position of the device.

It will be appreciated that the finger, and thus the projection 136, is arranged at a particular position around the circumference of the body 111 relative to the formations 129, so that the formations 129 cooperate with a rib 118 in the manner described with the previous embodiments when the projection 136 is engaged in each of the grooves 133 to 135 respectively. Accordingly the position of the finger is such that when the projection is engaged in the groove 135 the relation between a formation 129 and a rib 118 is such that the associated sprung lug 114 carrying the rib is in its 'neutral' position between its two extreme positions where it is either flexed inwardly or outwardly by engagement of its rib with the inner or outer surface 130,131 respectively of the formation 129. Similarly the finger is arranged so that when its projection 136 enters the groove 134 each rib 118 is engaged by an outer operating surface 131 to flex the sprung lug 114 outwardly and allow release of the pipe.

Lastly, as will now be appreciated, the position of the locking finger is such that when its projection 136 is engaged in the groove 133 each rib 118 is engaged by the inner operating surface 130 of a formation 129 to flex the associated sprung lug 114 inwardly so as to lock the pipe in place. As has been described, entry of the projection 136 into the groove 133 results in a 'locking together' of the cap nut and the body so that relative rotation between the two is resisted, so that in this state the connection device provides a double lock, is tamper resistant, i.e. against vandalism, and is also secure against release due to vibration or accidental release of any other kind. To release the locking together of the cap nut and the body, it is necessary to insert an implement/tool, such as a screwdriver blade, through the opening 139 from the exterior of the cap nut, to push the projection 136 inwardly whilst at the same time moving the cap nut and the body relative to one another to allow the projection 136 to move towards the groove 135 and thence to the groove 134 to allow pipe release if required.

It will be appreciated that in an alternative arrangement it may be possible to arrange for the means to lock the cap nut and body against relative rotation therebetween the opposite way round, i.e. with a flexible member or equivalent on the cap nut engaging in respective grooves or equivalent of the body 111. In a still further arrangement locking means could be a combination of both of these arrangements. The flange 141 can have marking 142, alignable with slot 139, constituting means to indicate exteriorly whether the connection device is in, each or any of the pipe release, pipe locked and neutral positions. Additionally or alternatively, the outer surface of the projection 136 could be brightly coloured so that when the connector is in its locked state, the projection is readily visible through the opening 139 to indicate exteriorly the state of the connector. In yet still further arrangements, these rotational locking means could also or alternatively operate in the neutral position and/or the unlocked position of the connection device.

Rotation stops in the form of ribs 143 extending normally from flange 140 are provided on the exterior surface of the body 111, these cooperating, in use, with cap nut retaining lugs 144 on the interior surface thereof. Alternatively or additionally, the respective radial side surfaces of the slots 133 and 134 could be arranged to act as rotation stops engaged by the projection 136.

Another connection device 145 is shown in FIGS. 47 and 48, this having a different external appearance from the embodiments heretofore described. However its internal structure and operation can be as for any of such embodiments and variations described. A corrugated pipe 146 is shown engaged with the device.

FIG. 49 shows an internal section for the device of FIGS. 47 and 48 when used without a seal, but having the rotation lock of FIGS. 36 to 46. In FIG. 49 the device is shown in the neutral position described hereinbefore.

FIG. 50 is similar to FIG. 49, differing only in showing the device including a seal 147. The section shown in FIG. 52 is for the device 145 of FIG. 50 having unlock, neutral and lock positions, with the rotation lock, and in the neutral position. FIG. 53 shows the device with only neutral and lock positions, with the rotation lock, and in the neutral position, whilst FIG. 54 again shows the rotation lock, the device being in the neutral position and having only unlock and neutral positions. FIG. 55 shows the ribs of the lugs relative to the formations, when the device is in the neutral position. As can be seen from FIG. 55 the number and length of the formations is devised to provide mechanical advantage, in use, whereby the flexible lug is easily moved between the locked and unlocked positions. The leading and trailing edges of both the lugs and the formations are devised to accommodate the lugs being radially displaced from their normal 'at rest' positions.

FIGS. 56 to 60 generally correspond to FIGS. 50, 51, 52, 53 and 55 respectively, but with the device in each case in its locked position instead of its neutral position.

FIGS. 61 to 65 generally correspond to FIGS. 50, 51, 52, 54 and 55 respectively, but with the device in each case in its unlocked position.

With all the embodiments so far described herein, the lugs have been 'forced' inwardly by the formations, in the locked state of the connection device. However in the embodiment of FIGS. 66 to 70, the formations are arranged so that instead of engaging the ribs to move them inwardly to 'lock' onto the pipe, when there is relative rotation in one direction between the cap nut and the body, the formations are arranged merely to move behind the ribs, but not to engage them, or at least, not to force them inwardly. Thus each of the formations, in this position, acts as a backstop (passive lock) to prevent the release of the pipe from the connection device by a force trying to move the lugs, and thus the projections, outwardly from said 'at rest' position. This represents an improvement over arrangements where such a force is not resisted.

Figure 66:
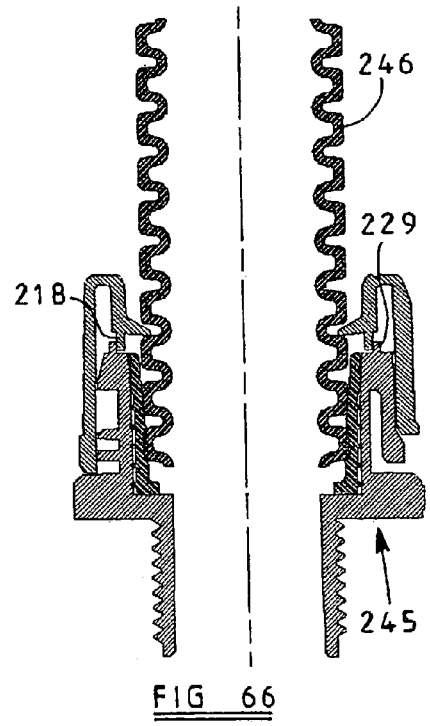
Figure 67:
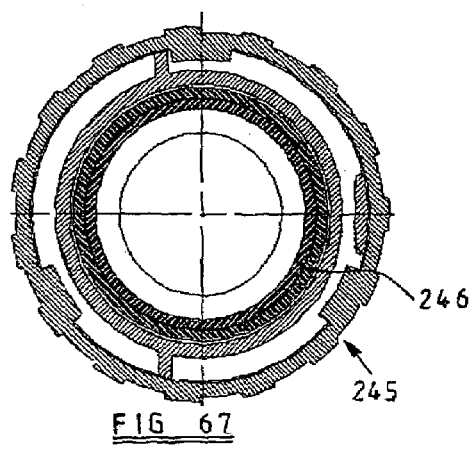
Figure 68:
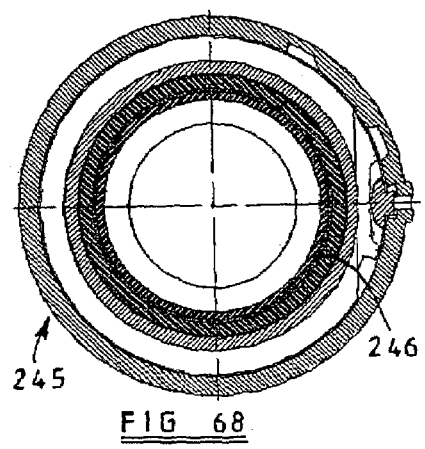
Figure 69:
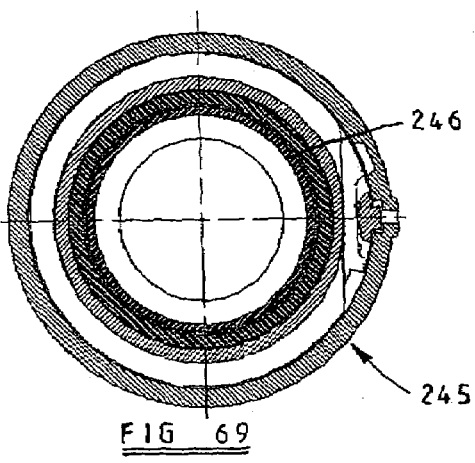

FIGS. 66 to 70 generally correspond to FIGS. 50, 51, 52, 53 and. 55 respectively, but with the device in the 'locked' position, and the rotation lock also in this position. However as can be seen from FIGS. 66 and 70, the device 245 of this embodiment incorporates the passive lock referred to above. By contrasting FIG. 70 with FIGS. 55 and 60, it can be seen that the formations 229 are arranged so that in the locked position of the device they do not move the ribs 218 inwardly, as in FIG. 60, but merely move directly behind the ribs 218 which effectively remain in their 'neutral' radial position shown in FIG. 55. Thus as also shown in FIG. 66 the formations merely prevent the ribs 218 moving outwardly to effect the unlocking of the lugs 224 from the pipe 245.

Of course, with all of the other embodiments/arrangements described, the rotation lock of the embodiment of FIGS. 36 to 46 and/or the passive lock of the embodiment of FIGS. 66 to 70 may or may not be included.

More generally, there are also alternative arrangements, to be referred to herebelow, with which the rotation lock and/or the passive lock features can be combined.

In respect of all the embodiments/arrangements disclosed herein in relation to FIGS. 1 to 35, the two basic structures of the connection device are:.

A1. 3 positions (neutral, lock and unlock)+no seal
A2. 3 positions (neutral, lock and unlock)+seal
An alternative basic structure also mentioned is:
A3. 2 positions (neutral and unlock)+seal
Other possible arrangements within the scope of this application, and to which reference is now made, are:
A4. 2 positions (neutral and unlock)+no seal
A5. 2 positions (neutral and lock)+no seal
A6. 2 positions (neutral and lock)+seal
A7. 1 position (neutral only)+no seal
A8. 1 position (neutral only)+seal
A9. 2 positions (lock and unlock)+no seal
A10. 2 positions (lock and unlock)+seal In relation to FIGS. 36 to 46 and FIGS. 66 to 70 respectively, there are the two per se inventive features of the rotation lock and the passive lock, in respective possible combinations, namely:
B1. A1 or A2+rotation lock
B2. A1 or A2+a 'passive' lock
B2 A. A1 or A2+rotation lock+passive lock An example of the rotation lock is that described and illustrated in relation to FIGS. 36 to 46, whilst an example of the passive lock is that described and illustrated in relation to FIGS. 66 to 70, where the formations 229 move behind the ribs 218 rather than forcing them inwardly (so that as described, in the locked position, merely to prevent the sprung lugs being forced outwardly from the position in which they retain the conduit in the connection device by their resilience alone).

Other possible combinations, within the scope of the invention, with all the above alternatives are as follows:
B3. A3+rotation lock (with the rotation lock in the neutral position)
B4. A4+rotation lock (with the rotation lock in the neutral position)
B5. A5 or A6+rotation lock
B6. A5 or A6+'passive' lock
B7. A5 or A6+rotation lock+'passive' lock
B8. A5+a chamfer provided on the leading edge of the projection of a sprung lug to assist extraction of the conduit when the cap nut is in the neutral position
B8a. A5+chamfered tooth+rotation lock
B8b. A5+chamfered tooth+'passive' lock
B8c. A5+chamfered tooth+rotation lock+'passive' lock
B9. A6+a chamfer provided on the leading edge of the projection of a sprung lug to assist extraction of the conduit when the cap nut is in the neutral position
B9a. A6+chamfered tooth+rotation lock
B9b. A6+chamfered tooth+'passive' lock
B9c. A6+chamfered tooth+rotation lock+'passive' lock
B10. A9+rotation lock
B11. A9+'passive' lock
B12. A9+rotation lock+'passive' lock
B13. A10+rotation lock
B14. A10+'passive' lock
B15. A10+rotation lock+'passive' lock Particularly the following features should be noted:
1. For those embodiments which have only neutral and unlock, the rotation lock is arranged to engage in the neutral position.

2. For those embodiments which have only neutral and lock, a chamfer on the leading edge of the sprung lug, i.e. the projection, can be introduced to allow the conduit to be withdrawn when the cap nut is in the neutral position. Such a chamfer 317 is shown in FIG. 71.

FIGS. 72 to 74 show how members other than corrugated piping or conduit are securable to a connection device of the invention. From these Figures it will be appreciated that the device can be used with any form of member, including piping or conduit, provided that a groove is suitably provided in its outer surface for engagement with the lugs of the first body part of the device.

FIG. 72 shows how a first device 445 with a corrugated pipe 446 connected thereto can have its main body end section 421 formed with a groove 421a, so that the end section 421 can be received in a further connection device 545 and engaged therewith.

FIG. 73 shows the connection device engaging an externally grooved tubular end fitting 446a, which is connected to an end of a plain conduit 446b for air and/or fluid flow, or for any other suitable purpose.

Finally FIG. 74 shows the connection device used to retain and interconnect the two components of an electrical plug and socket assembly for electrical wiring. The plug 448 is received in the main body of the connection device against the inner end shoulder surface thereof, with three wires 448a extending therefrom out of the body. It has three corresponding pins 448b extending inwardly into the interior of the main body in which is received the socket 449, which has three corresponding contacts 449a to receive and electrically couple with the pins. Respective wires 449b extend from the contacts out of the end of the socket at the cap nut of the connection device. The socket has an external annular groove 449c in which the lugs of the cap nut are received to lock the socket in place and thus also to hold the plug in position. A sleeve 449d can extend from the socket to protect the wires 449b. By way of the groove, the socket acts equivalently to the conduits 146 et al in being engaged with the connection device.

These examples demonstrate the versatility of the connection device of the invention in being capable of use with very many different forms of members, including members other than piping/conduits.

It will be appreciated that the invention relates to all combinations of one or more of the three positions (lock, unlock and neutral), with or without sealing means, with or without a rotation lock, with or without a passive or active lock, and with or without a chamfer on the respective leading edges of the sprung lugs.

The invention claimed is:

1. A connection device for fitting to a member having an external groove in an outer surface of one part thereof, the device comprising a first tubular body having one of its ends open to receive said part of said member in a bore communicating with said open end, the first body having a plurality of resilient lugs with respective projections at or adjacent their ends for reception in said groove in said outer surface of said member to retain said member, in use, and a second tubular body which can be movably coupled with the first body, there being defined two discrete relatively angularly adjusted positions between the first and second bodies when they are coupled together, said two discrete positions being i) a neutral position where said member is retained in the first body against withdrawal by the resilience alone of said lugs in the absence of any movement between the first and second coupled bodies, and ii) an unlocked position where the projections are released from the member to allow its removal from the first body in the absence of any axial displacement of the member as the first and second bodies are moved relative to each other.

2. A connection device as claimed in claim 1, wherein said lugs have respective engagement means, and said second body has a plurality of formations which, in use, in said unlocked position engage said engagement means to apply force which effects a release of the projections from the member.

3. A connection device as claimed in claim 2, wherein the engagement means extend axially from respective free ends of the projections.

4. A connection device as claimed in claim 2, wherein the formations extend axially from an inner free end of the second body.

5. A connection device as claimed in claim 2, wherein each formation provides respective inner and outer cam faces.

6. A connection device as claimed in claim 2, wherein the formations are of scroll cam form.

7. A connection device as claimed in claim 2, wherein, in use, in said unlocked position, said formations engage said engagement means to apply a force which effects a release of the projections from the member thereby allowing its removal from the first body.

8. A connection device as claimed in claim 2, wherein, in use, in said neutral position the engagement means of each lug is disposed between adjacent ones of said formations, which thus apply no force thereto.

9. A connection device as claimed in claim 1, wherein each projection has its tip offset from the root of its associated lug, so that attempted axial withdrawal of a retained member, in use, produces a force on the lug in a direction substantially normal to and towards an axis of said member.

10. A connection device as claimed in claim 9, wherein each projection has its front face angled rearwardly relative to the direction of said attempted withdrawal of the member.

11. A connection device as claimed in claim 1, comprising sealing means to seal with said member received in said bore, in use.

12. A connection device as claimed in claim 11, wherein the sealing means is a separate component received in said second body.

13. A connection device as claimed in claim 12, wherein the sealing means is an annular internally tapered elastomeric seal.

14. A connection device as claimed in claim 1, in which is defined a third discrete relatively angularly adjusted position between the first and second bodies when they are coupled together, namely a locked position where the projections are prevented from moving in a direction to release from the member.

15. A connection device as claimed in claim 14, wherein relative angular movement of the second body from said neutral position to said unlocked and locked positions is in opposite directions respectively.

16. A connection device as claimed in claim 1, wherein the lugs are spaced from an inner surface of the first body.

17. A connection device as claimed in claim 1, wherein the first and second bodies are coupled together, in use, with at least part of the second body received through another open end of the first body.

18. A connection device as claimed in claim 1, wherein means are provided on the exterior of at least one of the first and second bodies to indicate the correct relative rotational positions between said bodies to give said discrete positions respectively.

19. A connection device as claimed in claim 1, wherein the second body has a plurality of formations arranged such that, in use, in said neutral position where said member is retained by the resilience alone of the lugs, said formations prevent movement of the lugs to release the member.

20. A connection device as claimed in claim 19, wherein said formations are positioned behind said lugs to prevent said movement thereof to release the member.

21. A connection device as claimed in claim 19, in which is defined a third discrete relatively angularly adjusted position between the first and second bodies when they are coupled together, namely a locked position where the projections are prevented from moving in a direction to release from the member.

22. A connection device as claimed in claim 21, wherein said formations prevent said movement of the lugs in the locked position only.

23. A connection device as claimed in claim 1, wherein a chamfer is provided on a leading edge of each projection to assist extraction of the member.

24. A connection device as claimed in claim 1, including sealing means to seal with said member received in said bore, in use, the sealing means comprising a tapered section of the interior of the second body against which the member seals, in use.

25. A connection device as claimed in claim 1, wherein no sealing means for said member, in use, is provided.

26. A connection device for fitting to a member having an external groove in an outer surface of one part thereof, the device comprising a first tubular body having one of its ends open to receive said part of said member in a bore communicating with said open end, the first body having plurality of resilient lugs with respective projections at or adjacent their ends for reception in said groove in said outer surface of said member to retain said member, in use, and respective engagement means on the resilient lugs, a second tubular body which can be movably coupled with the first body, the second body having a plurality of formations arranged such that with said first and second bodies coupled together and in a relative position in which said member is retained in the first body against withdrawal by the resilience alone of said lugs in the absence of any movement between the first and second bodies as the grooved outer surface of the member is engaged with the lugs, the second body is relatively angularly movable from said relative position to two other positions respectively, in one of which said formations engage said engagement means to apply force which effects a locking of the projections to the member, and in the other of which said formations engage said engagement means to apply force which effects a release of the projections from the member thereby to allow its removal from said first body, movement of the second body to the two other positions occurring in the absence of any axial displacement of the member relative to the first and second bodies.

27. A connection device as claimed in claim 26, wherein the engagement means extend axially from respective free ends of the projections.

28. A connection device as claimed in claim 26, wherein the formations extend axially from an inner free end of the second body.

29. A connection device as claimed in claim 26, wherein each formation provides respective inner and outer cam faces.

30. A connection device as claimed in claim 26, wherein the formations are of scroll cam form.

31. A connection device as claimed in claim 26, comprising sealing means to seal with said member received in said bore, in use.

32. A connection device as claimed in claim 31, wherein the sealing means is a separate component received in said second body.

33. A connection device as claimed in claim 32, wherein the sealing means is an annular internally tapered elastomeric seal.

34. A connection device for fitting to a member having an external groove in an outer surface of one part thereof, the device comprising a first tubular body having one of its ends open to receive said part of said member in a bore communicating with said open end, the first body having a plurality of resilient lugs with respective projections at or adjacent their ends for reception in said groove in said outer surface of said member to retain said member, in use, and a second tubular body which can be movably coupled with the first body, there being defined two discrete relatively angularly adjusted positions between the first and second bodies when they are coupled together, said two discrete positions being i) a neutral position where said member is retained in the first body against withdrawal by the resilience alone of said lugs in the absence of any movement between the first and second bodies as the grooved outer surface of the member is engaged with the lugs, and ii) a locked position where the projections are prevented from moving in a direction to release from the member in the absence of any axial displacement of the member as the first and second bodies are moved relative to each other.

35. A connection device as claimed in claim 34, wherein said lugs have respective engagement means, and said second body has a plurality of formations which, in use, in said locked position engage said engagement means to apply force which effects a locking of the projections to the member.

36. A connection device as claimed in claim 35, wherein the engagement means extend axially from respective free ends of the projections.

37. A connection device as claimed in claim 35, wherein the formations extend axially from an inner free end of the second body.

38. A connection device as claimed in claim 35, wherein each formation provides respective inner and outer cam faces.

39. A connection device as claimed in claim 35, wherein the formations are of scroll cam form.

40. A connection device as claimed in claim 34, wherein each projection has its tip offset from the root of its associated lug, so that attempted axial withdrawal of a retained member, in use, produces a force on the lug in a direction substantially normal to and towards an axis of said member.

41. A connection device as claimed in claim 40, wherein each projection has its front face angled rearwardly relative to the direction of said attempted withdrawal of the member.

42. A connection device as claimed in claim 34, comprising sealing means to seal with said member received in said bore, in use.

43. A connection device as claimed in claim 42, wherein the sealing means is a separate component received in said second body.

44. A connection device as claimed in claim 43, wherein the sealing means is an annular internally tapered elastomeric seal.

45. A connection device as claimed in claim 34, wherein the lugs are spaced from an inner surface of the first body.

46. A connection device as claimed in claim 34, wherein the first and second bodies are coupled together, in use, with at least part of the second body received through another open end of the first body.

47. A connection device as claimed in claim 34, wherein means are provided on the exterior of at least one of the first and second bodies to indicate the correct relative rotational positions between said bodies to give said discrete positions respectively.

48. A connection device as claimed in claim 34, wherein the second body has a plurality of formations arranged such that, in use, in at least one of said neutral and locked positions said formations prevent movement of the lugs to release the member.

49. A connection device as claimed in claim 48, wherein said formations are positioned behind said lugs to prevent said movement thereof to release the member.

\* \* \* \* \*